United States Patent
Miura et al.

(10) Patent No.: US 6,687,411 B1
(45) Date of Patent: Feb. 3, 2004

(54) IMAGE CODING/DECODING METHOD AND RECORDING MEDIUM HAVING PROGRAM FOR THIS METHOD RECORDED THEREON

(75) Inventors: Takashi Miura, Hokkaido (JP);
Fumihiko Itagaki, Hokkaido (JP);
Miyuki Kawashima, Hokkaido (JP)

(73) Assignee: Hudson Co., Ltd., Hokkaido (JP)

( * ) Notice: Subject to any disclaimer, the term of this patent is extended or adjusted under 35 U.S.C. 154(b) by 0 days.

(21) Appl. No.: 09/720,551

(22) PCT Filed: Jun. 3, 1999

(86) PCT No.: PCT/JP99/02962

§ 371 (c)(1),
(2), (4) Date: Dec. 26, 2000

(87) PCT Pub. No.: WO00/02393

PCT Pub. Date: Jan. 13, 2000

(30) Foreign Application Priority Data

Jul. 3, 1998 (JP) .......................... 10/189239

(51) Int. Cl.[7] .................................. G06K 9/36
(52) U.S. Cl. ..................................... 382/250
(58) Field of Search ................ 382/232–233; 375/240–241; 348/399, 423.1

(56) References Cited

U.S. PATENT DOCUMENTS

| | | | | |
|---|---|---|---|---|
| 5,757,969 A | * | 5/1998 | Kim | 382/236 |
| 5,841,909 A | | 11/1998 | Yokoyama | |
| 5,852,682 A | * | 12/1998 | Kim | 382/233 |
| 5,937,098 A | * | 8/1999 | Abe | 382/239 |
| 6,115,070 A | * | 9/2000 | Song et al. | 375/240.12 |
| 6,456,655 B1 | * | 9/2002 | Suzuki | 375/240.03 |
| 6,477,276 B1 | * | 11/2002 | Inoue et al. | 382/251 |

FOREIGN PATENT DOCUMENTS

JP    7-38760    2/1995

OTHER PUBLICATIONS

The Institute of Electronics, Information and Communication Engineers, Technical Report of IEICE, NLP 98–35, H. You et a. vol. 98, No. 146, Jun. 1998, pp. 37–42.
The Institute of Electronics, Information and Communication Engineers, vol. J71–B, No. 12, Dec. 1998, pp. 1528–1536.
The Institute of Electronics, Information and Communication Engineers, Mar. 1987, p. 54.
A Study of AC Prediction Method Making Use of Mean Value, T. Watanabe et al., Oct. 1989, pp. 29–30.
The Institute of Electronics, Information and Communication Engineers, vol. J81–D–II, No. 4, Apr. 1998, pp. 778–780.

* cited by examiner

*Primary Examiner*—Jingge Wu
(74) *Attorney, Agent, or Firm*—Katten Muchin Zavis Rosenman

(57) ABSTRACT

The invention relates to an image coding/decoding method and to a recording medium on which a program for this method has been recorded, and the object thereof is to raise the compression rate of image data while the image data is maintained at a high quality. In FIG. 1(A), image data is divided into a plurality of pixel blocks, a DC image comprising mean values of respective ones of the blocks is generated, a corresponding block mean value is separated from each pixel block and a residual vector is obtained for every block. In a case where the magnitude of the residual vector is equal to or greater than an allowable value, orthogonal bases for approximating the residual vector by an adaptive orthogonal transformation that employs a nest of the DC image is obtained and coded. In FIG. 1(B), in a case where the residual vector is less than the allowable value, pixel data of 4×4 pixels of a local block S is reproduced directly on the decoding side by a direct method of AC component prediction, instead of coding the orthogonal base, based upon five items of DC image data of upper, bottom, left, right blocks U, B, L, R inclusive of a local block S comprising a block mean value of 4×4 pixels.

6 Claims, 17 Drawing Sheets

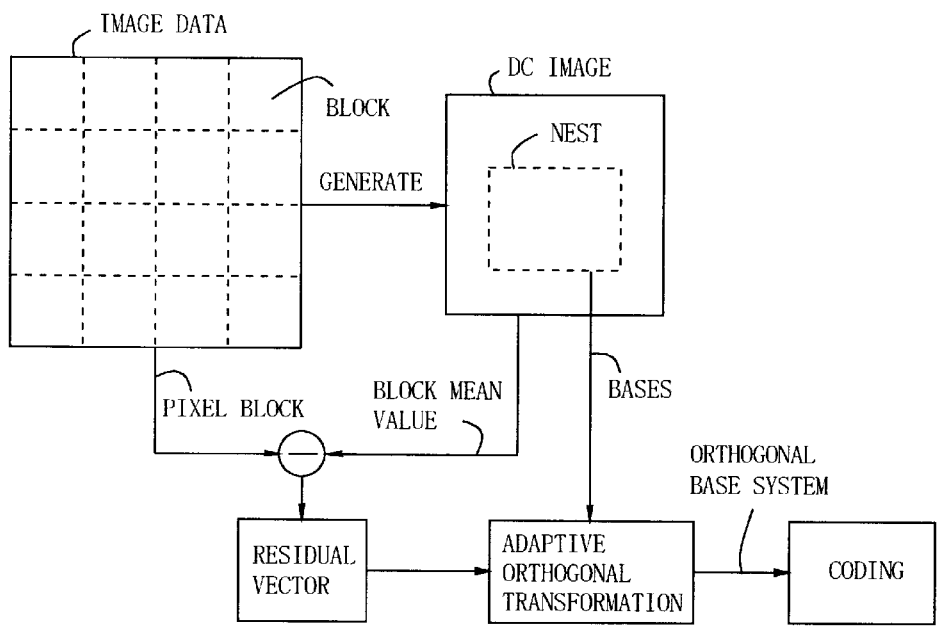
(A)
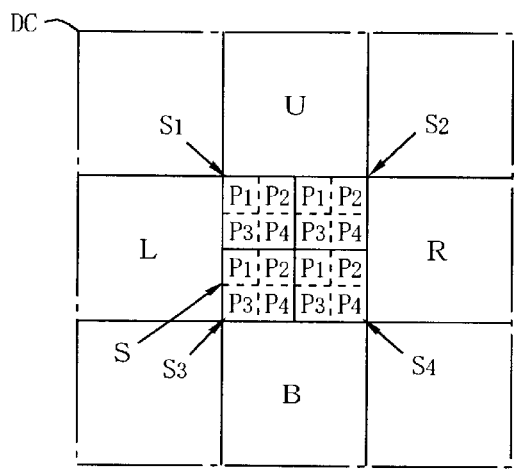
(B)
FIG. 1

| Z | Qs |
|---|---|
| $Z \leq 100$ | 1 |
| $100 < Z \leq 400$ | 2 |
| $400 < Z \leq 1600$ | 4 |
| $1600 < Z$ | 8 |

(A) QUANTIZATION COEFFICIENT TABLE

| NUMBER OF REMAINING BASES ($y_k$) | QUANTIZATION COEFFICIENT ($Q_{yk}$) | FIXED-LENGTH CODE (bits) | RANGE OF CODE |
|---|---|---|---|
| 7 | 2 | $16 \times 7$ | $[-64, 63]$ |
| 6 | 3 | $16 \times 6$ | $[-32, 31]$ |
| 5 | 4 | $16 \times 5$ | $[-16, 15]$ |
| 4 | 5 | $16 \times 4$ | $[-8, 7]$ |
| 3 | 6 | $16 \times 3$ | $[-4, 3]$ |
| 2 | 7 | $16 \times 2$ | $[-2, 1]$ |
| 1 | 8 | $16 \times 1$ | $[-1, 0]$ |

(B) SCALAR QUANTIZATION TABLE

FIG. 8

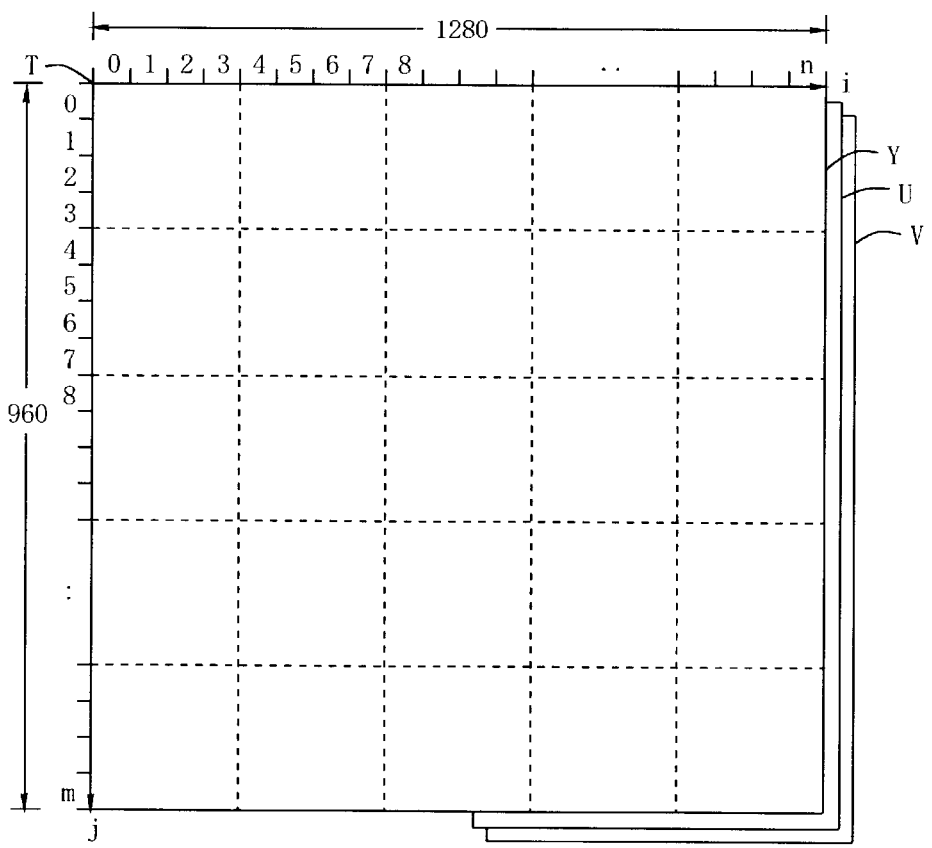
(A) ORIGINAL IMAGE
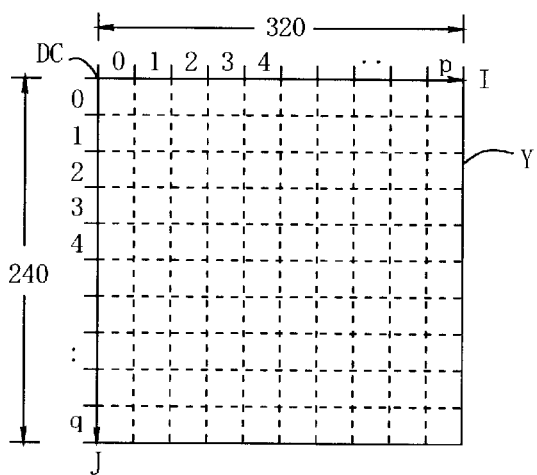
(B) DC IMAGE
FIG. 9

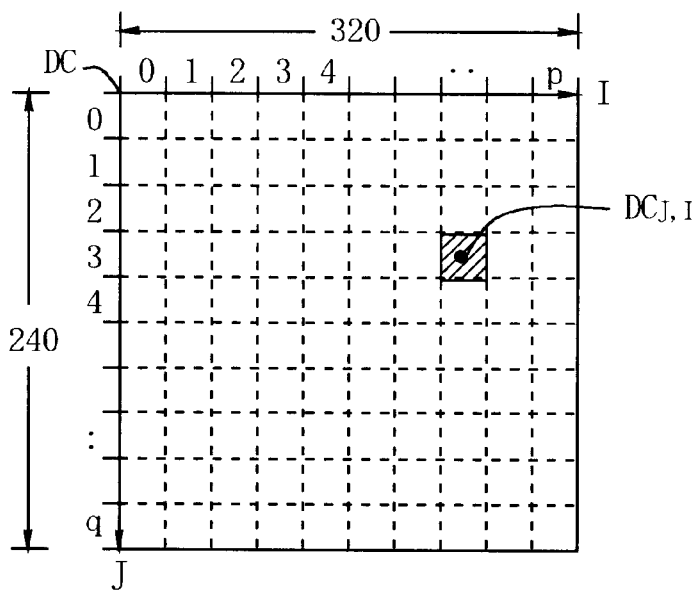
(A) DPCM CODING
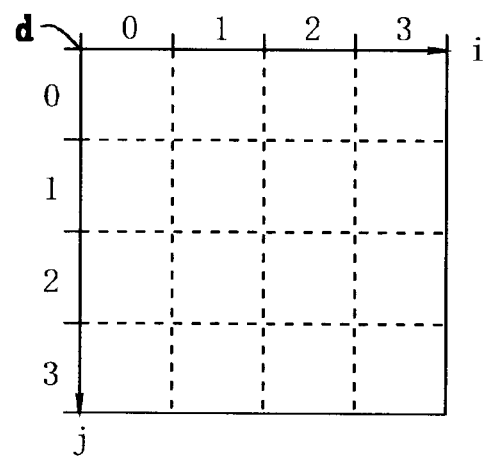
(B) RESIDUAL VECTOR
FIG. 10

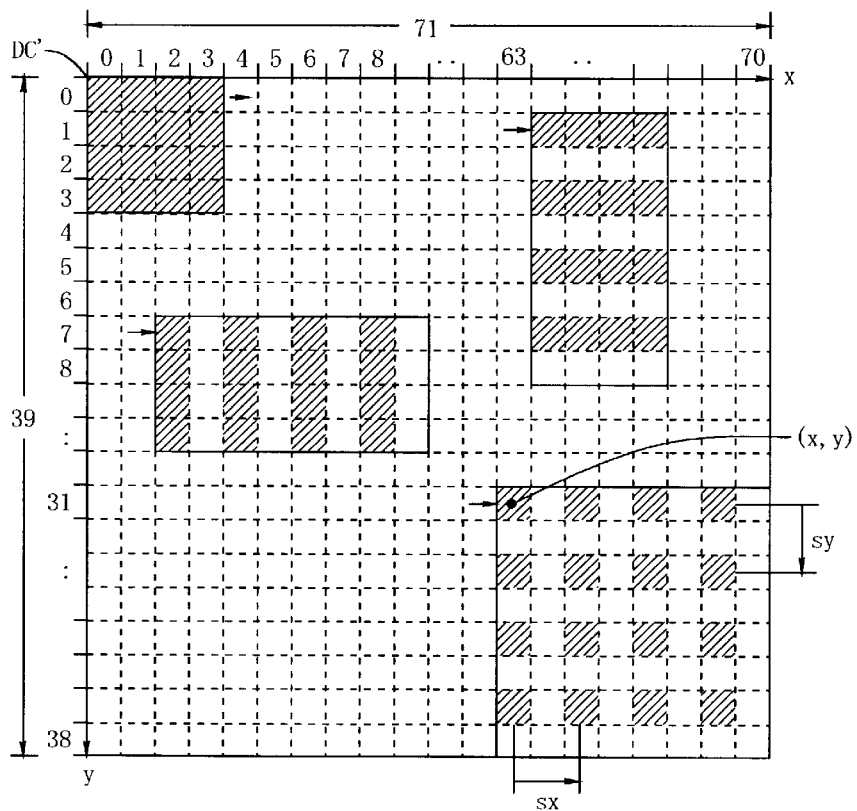
(A) NEST DATA
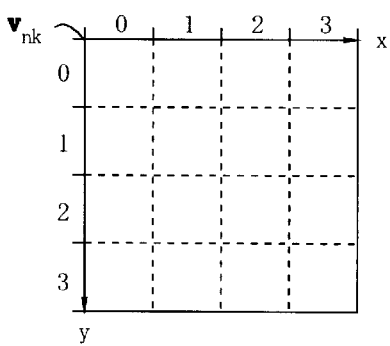
(B) BASE DATA
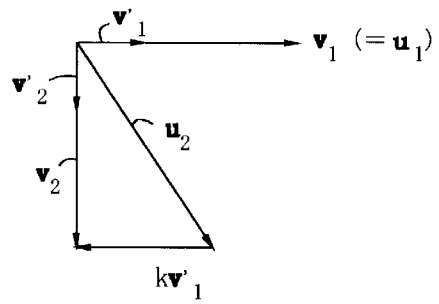
(C) GRAM SCHMIDT ORTHOGONALIZATION
FIG. 11

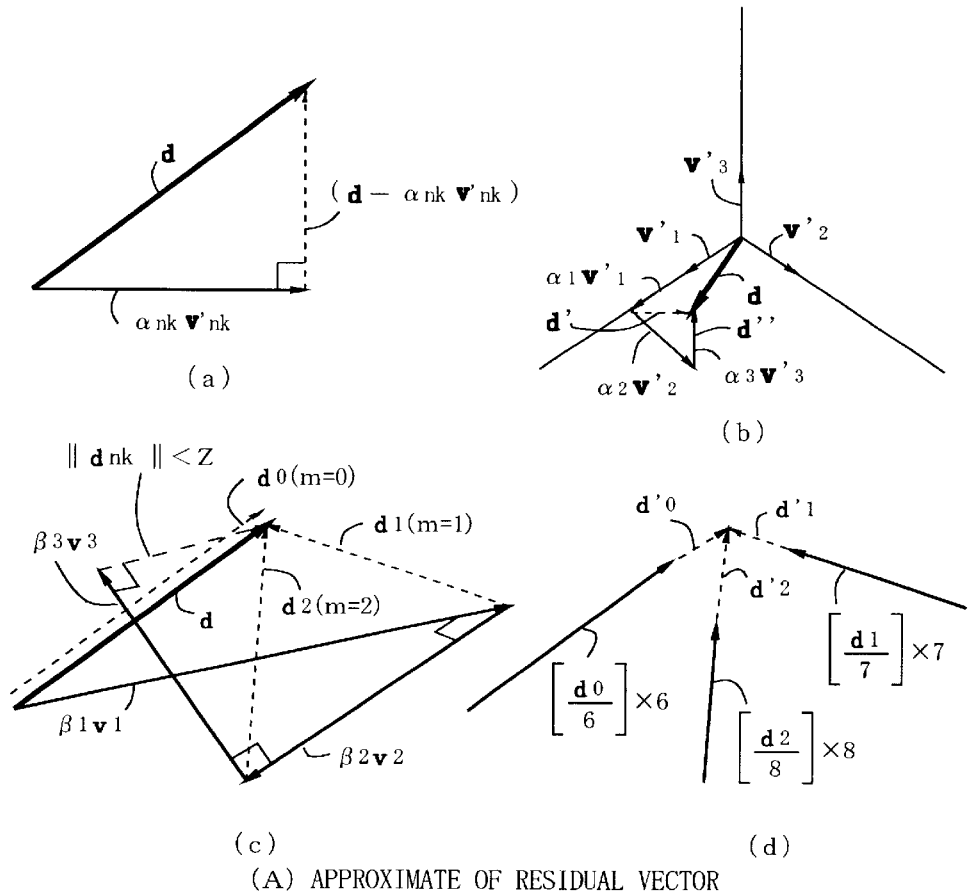

(A) APPROXIMATE OF RESIDUAL VECTOR

| CASE<br>CODE | $\|d\|^2 < Z$ | $nk \leq 7$ | $nk > 7$ |
|---|---|---|---|
| F1 | NUMBER "0" OF BASES | NUMBER "nk" OF BASES | NUMBER "8" OF BASES |
| F2 | | NUMBER "mk" OF BASES USED | NUMBER "0" OF BASES USED |
| F3 | | $[d'_{mk}/Q_{yk}]$ | $d$ |
| F4 | | $(x, y)$<br>$(sx, sy)$<br>REMAINDER OF $\beta/Q$ | |
| F5 | | QUOTIENT OF $\beta/Q$ | |
| F6 | $\triangle DCJ, I/Q_s$ | $\triangle DCJ, I/Q_s$ | $\triangle DCJ, I/Q_s$ |

(B) BLOCK-IMAGE COMPRESSION CODE

FIG. 12

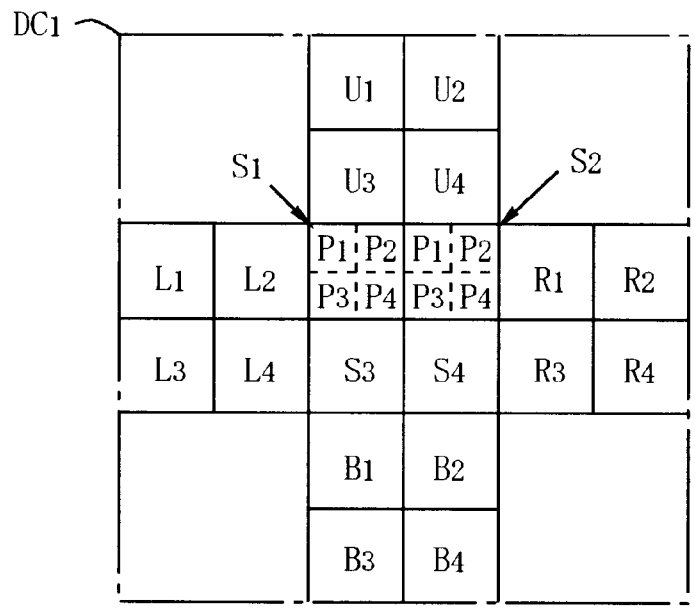
(A)
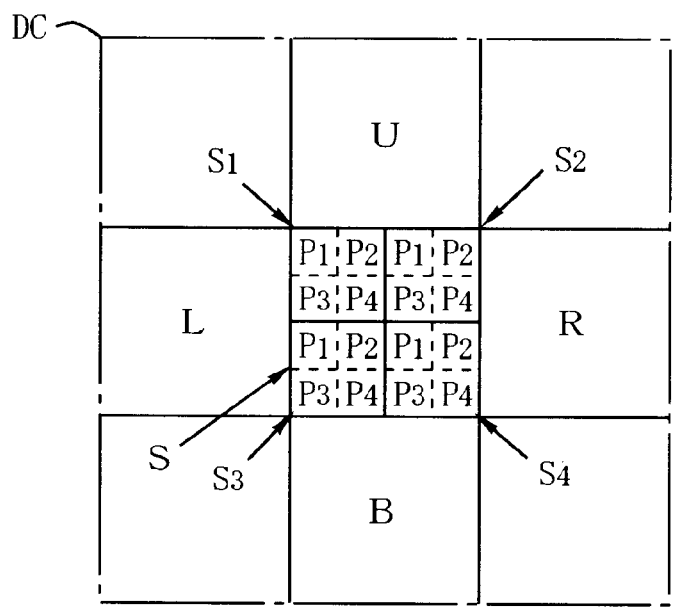
(B)
FIG. 14

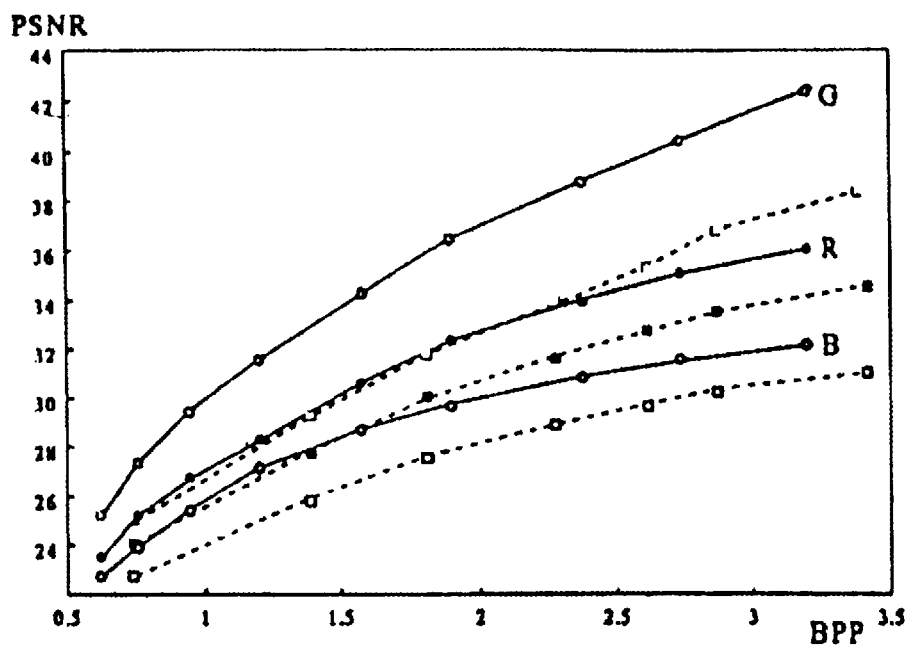
(A) ANIMATED IMAGE
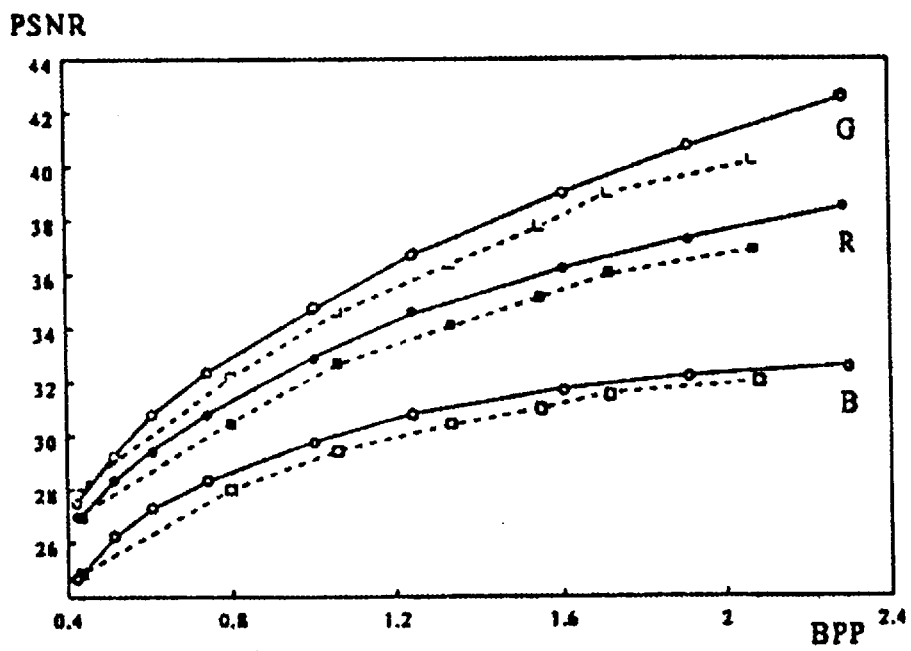
(B) CG IMAGE
FIG. 15

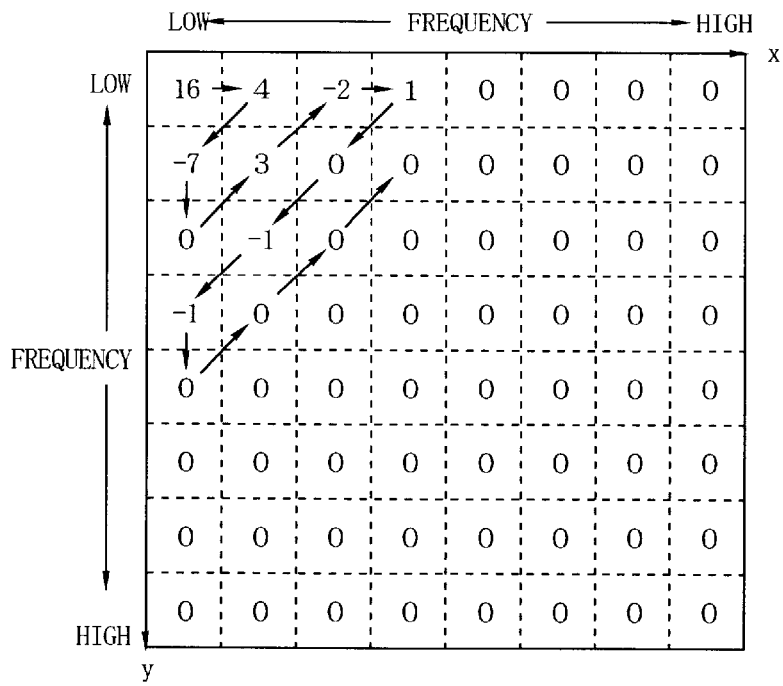
(A) DCT DATA
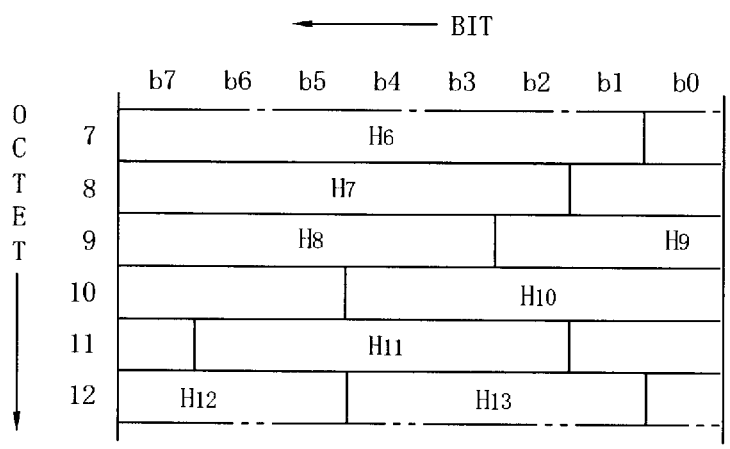
(B) HUFFMAN CODING
FIG. 16

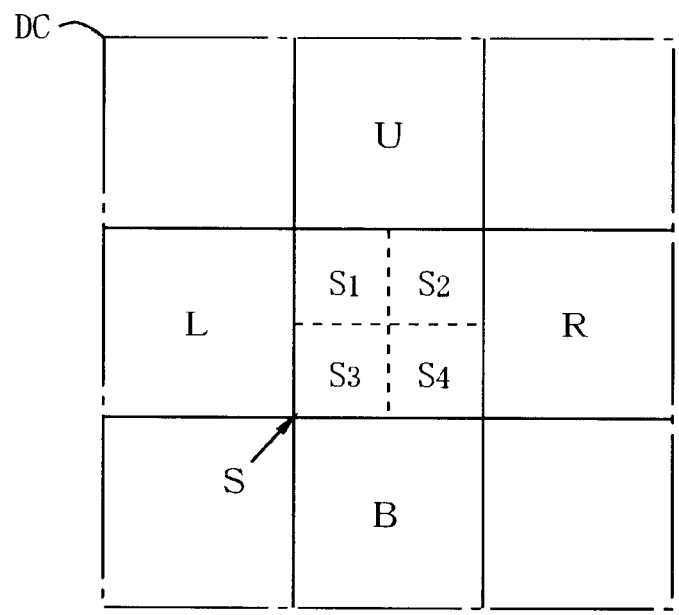
(A) FIRST STEP
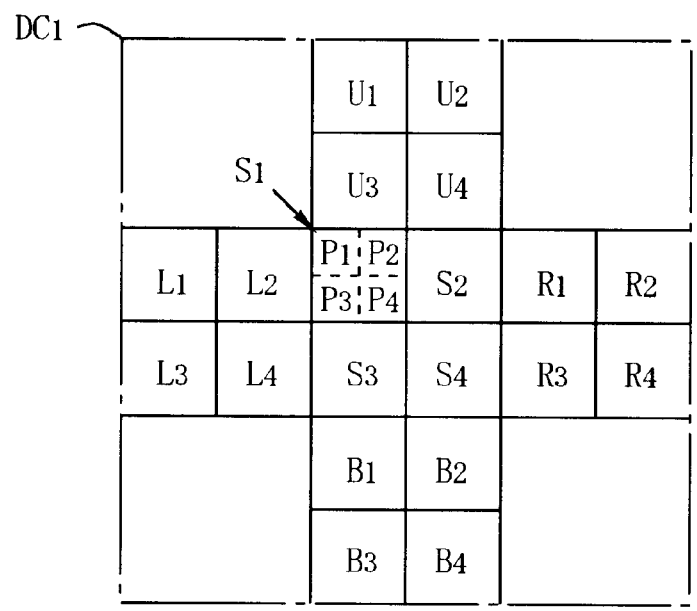
(B) SECOND STEP
FIG. 17

IMAGE CODING/DECODING METHOD AND RECORDING MEDIUM HAVING PROGRAM FOR THIS METHOD RECORDED THEREON

TECHNICAL FIELD

This invention relates to an image coding/decoding method and to a recording medium on which a program for this method has been recorded. More specifically, the invention relates to an image coding/decoding method that is capable of reproducing a high-quality image (CG images, animated images and natural images, etc.) at high speed even with comparatively low-performance hardware (CPU, memory, etc.) such as that of a game machine, and to a recording medium on which the program of this method has been recorded.

BACKGROUND ART

FIGS. 16 and 17 diagrams (1), (2), for describing the prior art, in which FIG. 16 illustrates the concept of image compression processing in accordance with the JPEG standard.

In accordance with the JPEG standard, which currently is the main scheme for compressing still pictures, an image is divided into blocks of 8×8 pixels, as shown in FIG. 16(A), and the block is converted to DC (a mean value) and to coefficient values ranging from a fundamental frequency to a frequency which is 63 times the fundamental frequency by a two-dimensional DCT (Discrete Cosine Transform). By utilizing the fact that the frequency components of a natural image concentrate in the low-frequency region, each coefficient value is quantized at a different quantization step to such an extent that image quality will not decline, and variable-length coding (Huffman coding) is performed after the quantity of information is reduced.

In a case where such coded image data is utilized in a home game machine, the fact that there are limitations upon CPU performance and memory capacity results in various disadvantages when an image compression method (JPEG, etc.) involving a large decoding burden is implemented by software. For example, with the JPEG scheme, 64 codes for undergoing variable-length coding are generated for a block of 8×8 pixels, thereby inviting an increase in computation load at the time of decoding.

FIG. 16(B) illustrates a portion of Huffman code.

With Huffman coding, a coefficient $H_{13}$, etc., having a high frequency of appearance is coded by bits of relatively short code length, and a coefficient $H_6$, etc., having a low frequency of appearance is coded by bits of relatively long code length. As a consequence, these codes are packed into each octet (byte) unevenly in the manner illustrated. This increases computation load greatly at the time of decoding. In a conventional game system, therefore, the state of the art is such that sacrifice of image quality is inevitable in order to decode images at a speed that allows the images to appear as a moving picture.

In regard to image quality, the higher the frequency component, the coarser the precision with which quantization is carried out. As a result, image information concerning contours is lost, thereby producing mosquito noise. Such a scheme is not suitable for the compression of characters and animated images. In particular, since game software makes abundant use of artificial images (CG images and animated images, etc.), a decline in subjective image quality due to mosquito noise is a major problem.

In this regard, the following literature (1) to (5) has been reported in recent years:

(1) Michael F. Barnsley, Lyman P. Hurd "FRACTAL IMAGE COMPRESSION", A K Peters Ltd., 1993;
(2) Takashi Ida, Takeshi Datake "Image Compression by Iterative Transformation Coding", $5^{th}$ Circuit and System Karuizawa Workshop Collection of Papers, pp. 137–142, 1992;
(3) Hyunbea You, Takashi Takahashi, Hiroyuki Kono, Ryuji Tokunaga "Improving LIFS Image Coding Scheme by Applying Gram Schmidt Orthogonalization", The Institute of Electronics, Information and Communication Engineers Research Report, vol. NLP-98, no. 146, pp. 37–42, 1998;
(4) Toshiaki Watanabe, Kazuo Ozeki "Study of AC Component Prediction Scheme Using Mean Values", Image Coding Symposium (PCSJ89), pp. 29–30, October 1989; and
(5) Takashi Takahashi, Ryuji Tokunaga "High-Speed Computation Algorithm for Predicting AC Components from Block Mean Values of Images", The Institute of Electronics, Information and Communication Engineers Papers, Vol. J81-D-II, No. 4, pp. 778–780, April 1998.

Schemes (1) and (2) relate to fractal coding as a compression method involving little decoding computation load, scheme (3) relates to improvements in adaptive orthogonal transformation having a coding efficiency equivalent to that of the JPEG scheme, and schemes (4) and (5) concern AC-component prediction based upon block mean values (DC values).

Among these, scheme (3) is a block coding method which divides an image into square blocks of K×K pixels and approximates all blocks by the AC-component prediction method, fractal conversion method or adaptive orthogonal transformation, depending upon an allowable error Z. The AC-component prediction method is utilized in block coding by mean-value separation in which an AC component (addition data) of a local block is found from the block mean values (DC values) of blocks surrounding the local block, and the residual between this and an image of interest is coded. Adaptive orthogonal transformation is a method in which use is made of the autosimilarity possessed by an image, a base vector for approximating a block image is extracted from an image (nest) corresponding to a vector quantization code book, and an orthogonal base system of the minimum required dimensions is constructed by the Gram Schmidt Method.

However, the fractal conversion of schemes (1) and (2) necessitates iterative computation in decoding and consumes work space on the scale of the image plane. This scheme is therefore not suitable for video game machines.

The adaptive orthogonal transformation of scheme (3) utilizes addition data, the size of which is equivalent to that of the image of interest, as a nest. As a consequence, a very large work space is required at the time of decoding. Furthermore, though image quality is improved because blocks decompressed at the time of decoding are sequentially written back to corresponding blocks in the nest, the load imposed by address computation and data transfer is great. Further, Huffman coding is applied to compression of the coordinates of the base and to sampling coefficients in scheme (3). In the case of a natural image, however, large deviations are absent in the frequency of occurrence of any base whatsoever. Consequently, not only is there no improvement in compression efficiency but what is expended is only the amount of computation of Huffman code. With adaptive orthogonal transformation, there are cases where, depending upon the image, the number of orthogonal bases of the minimum required number of dimensions is large. When the number of bases is large, however, the number of bits used is greater than when the residual vector is coded directly, and coding efficiency declines as a result.

With the AC component prediction method of scheme (4), there is a tendency for overshoot or undershoot to occur in the vicinity of contours in the image, and image quality tends to be degraded in the case of artificial images in which luminance rises sharply.

In the case of the indirect method of AC component prediction of scheme (5), not only is the load on the CPU great but it is also required to have a storage area for interpolated values that are generated along the way.

FIG. 17 illustrates the concept of the indirect method of AC component prediction.

In accordance with indirect method of AC component prediction, as shown in FIG. 17(A), the DC values of sub-blocks $S_1 \sim S_4$ in a block S of interest are estimated in accordance with the following equations from the DC values (S, U, R, B, L) of four surrounding blocks and the block of interest:

$$S_1 = S + (U + L - B - R)/8$$

$$S_2 = S + (U + R - B - L)/8$$

$$S_3 = S + (B + L - U - R)/8$$

$$S_4 = S + (B + R - U - L)/8$$

In FIG. 17(B), the above equations are applied recursively, whereby the pixel values of four pixels $P_1 \sim P_4$ in sub-block $S_1$ can be estimated in accordance with the following equations:

$$P_1 = S_1 + (U_3 + L_2 - S_3 - S_2)/8$$

$$P_2 = S_1 + (U_3 + S_2 - S_3 - L_2)/8$$

$$P_3 = S_1 + (S_3 + L_2 - U_3 - S_2)/8$$

$$P_4 = S_1 + (S_3 + S_2 - U_3 - L_2)/8$$

Similarly, the pixel values of four pixels $P_1 \sim P_4$ in sub-block $S_2$ can be estimated in accordance with the following equations:

$$P_1 = S_2 + (U_4 + S_1 - S_4 - R_1)/8$$

$$P_2 = S_2 + (U_4 + R_1 - S_4 - S_1)/8$$

$$P_3 = S_2 + (S_4 + S_1 - U_4 - R_1)/8$$

$$P_4 = S_2 + (S_4 + R_1 - U_4 - S_1)/8$$

The pixel values of four pixels $P_1 \sim P_4$ in the sub-blocks $S_3$, $S_4$ can be estimated in a similar manner.

However, in order to obtain all of the predicted values $P_1 \sim P_4$ of the original image by starting from the initial DC values (S, U, R, B, L), the above-cited equations must applied in steps to achieve refinement and not only is a memory for storing intermediate values necessary but there is also an increase in computation load upon the CPU.

DISCLOSURE OF THE INVENTION

The present invention has been devised in view of the problems of the prior art mentioned above and an object thereof is to provide an image coding/decoding method in which the compression rate of computer-utilizable image data is raised while the image data is maintained at a high image quality, and in which computation load at the time of decoding can be reduced, as well as a recording medium having the program of this method recorded thereon.

The foregoing object is attained by the arrangement of FIG. 1(A). Specifically, an image coding method according to claim (1) of the present invention comprises dividing image data into a plurality of pixel blocks and generating a DC image comprising mean values of respective ones of the blocks; separating from each pixel block a corresponding block mean value and obtaining a residual vector for every block; and in a case where the magnitude of the residual vector becomes equal to or greater than an allowable value, obtaining one or two or more orthogonal bases for approximating the residual vector by an adaptive orthogonal transformation that employs a nest of the DC image; and coding an orthogonal base system comprising a linear combination of these orthogonal bases.

In claim (1) of the present invention, the load upon the CPU and memory at the time of image coding/decoding is greatly alleviated by virtue of the arrangement in which one, two or more orthogonal bases are obtained from the nest of the DC image. Further, an improvement in image quality can be expected in an artificial image such as a CG image or animated image which has many flat luminance components and, as a result, exhibits strong correlation with respect to the DC image.

Preferably, in claim (2) of the present invention, in a case where the magnitude of the residual vector is less than the allowable value in claim (1) of the present invention, information indicative of number of bases=0 is coded instead of obtaining orthogonal bases.

For example, with regard to an artificial image in which luminance rises sharply, code indicative of number of bases=0 is generated in limited fashion with respect to a pixel block in which a contour portion does not exist nearby (i.e., a pixel block in which the magnitude of the residual vector is less than the allowable value).

On the decoding side, on the other hand, the indirect method of AC component prediction or the direct method of AC component prediction according to the present invention is applied in limited fashion to the corresponding pixel block, thereby making it possible to reproduce the pixel block with little CPU and memory load.

Preferably, in claim (3) of the present invention, in a case where total amount of code of the orthogonal base system obtained in claim (1) of the present invention is equal to or greater than total amount of code of the residual vector, the residual vector itself is coded instead of the orthogonal base system. As a result, no purposeless decline in image compression rate is brought about.

Preferably, in claim (4) of the present invention, in a case where a first error $<d_{nk}>$ with respect to (between) a residual vector $<d>$ becomes less than the allowable value owing to a number nk of bases obtained in advance in claim (1) of the present invention, second error vectors $<d_m>$ following use of m ($0 \leq m < nk$) bases in the order in which the bases were obtained are scalar-quantized by quantization coefficients $Q_{yk}$ predetermined in accordance with a number yk (=nk−m) of remaining bases that have not been used, and the result is subjected to scalar inverse quantization; the smallest error is selected from among third error vectors $<d'_m>$ of nk types, which are obtained by subtracting the scalar inverse-quantized second error vectors from the second error vectors $<d_m>$, and the first error $<d_{nk}>$; and the corresponding bases and, if necessary, the corresponding second error vector, are coded.

One example of the coding method will be described in detail with reference to (c), (d) in FIG. 12(A). In (c) of FIG. 12(A), assume that there has been obtained a linear combination $$<d>≈β_1<v_1>+β_2<v_2>+β_3<v_3> \quad (nk=3)$$

comprising nk (e.g., nk=3) bases for which the magnitude $\|<d_{nk}>\|$ of the error with respect to the residual vector $<d>$ is made less than an allowable value Z. It should be noted that $<v>$ indicates that v is a vector.

A first error vector $<d_3>=<d_{nk}>$ in the case where nk=3 bases have been used and second error vectors $<d_0>\sim<d_2>$ following use of m ($0 \leq m<nk$) bases in the order in which they were obtained are related as follows:

| | |
|---|---|
| $<d_0> = <d>$ | (m = 0, yk = 3) |
| $<d_1> = <d> - β_1<v_1>$ | (m = 1, yk = 2) |
| $<d_2> = <d> - β_1<v_1> - β_2<v_2>$ | (m = 2, yk = 1) |
| $<d_3> = <d> - β_1<v_1> - β_2<v_2> - β_3<v_3>$ | (m = 3, yk = 0) |

In (d) of FIG. 12A, the second error vectors $<d_0>\sim<d_2>$ are scalar-quantized (and clipped) by respective ones of quantization coefficients $Q_{yk}$ (e.g., $Q_3=6$, $Q_2=7$, $Q_1=8$) predetermined in accordance with the remaining number of bases yk=3, 2, 1 not used, and these are subjected to inverse quantization by the same quantization coefficients $Q_{yk}$ to thereby find inverse-quantized second error vectors $<d_0Q'>\sim<d_2Q'>$.

$$<d_0Q'>=[<d_0>/Q_3] \times Q_3$$

$$<d_1Q'>=[<d_1>/Q_2] \times Q_2$$

$$<d_2Q'>=[<d_2>/Q_1] \times Q_1$$

where the symbol [ ] indicates that the result of computation is made a whole number.

Furthermore, there are found third error vectors $<d'_0>\sim<d'_2>$, which are obtained by subtracting these inverse-quantized second error vectors from respective ones of the second error vectors $<d_0>$, $<d_1>$, $<d_2>$.

$$<d'_0>=<d_0>-<d_0Q'>$$

$$<d'_1>=<d_1>-<d_1Q'>$$

$$<d'_2>=<d_2>-<d_2Q'>$$

The magnitudes of these third error vectors $<d'_0>\sim<d'_2>$ are not necessarily greater than the magnitude of the first error vector $<d_3>$. In other words, the final decoding error may be smaller when, as the result of coding the two bases $β_1<v_1>+β_2<v_2>$ and utilizing the amount of code of the one remaining base to scalar-quantize the second error vector $<d_2>$, the error after decoding becomes the third error vector=$<d'_2>$, than when, as the result of coding the three $β_1<v_1>+β_2<v_2>+β_3<v_3>$, the error after decoding becomes the first error vector=$<d_3>$.

Accordingly, in claim (4) of the present invention, from among the third error vectors $<d'_0>$, $<d'_1>$, $<d'_2>$ and first error vector $<d_3>$, the smallest error is selected and the corresponding bases and, if necessary, the corresponding second error vector, are coded.

In terms of the example set forth above, if the third error vector $<d'_2>$ gives the smallest error, $\{β_1<v_1>+β_2<v_2>\}$ is adopted as the orthogonal base system and these bases are coded. In addition, the second error vector $<d_2>$ is coded (scalar-quantized) conjointly. The quantization coefficients $Q_{yk}$ are decided in such a manner that the code thus generated will not exceed the total amount of code in a case where nk-number of bases are used. As a result, image quality can be improved without increasing the amount of code per pixel block.

Thus, the residual vector $<d>$ can be coded with higher precision by virtue of the arrangement of claim (4) of the present invention in which joint use is made of adaptive orthogonal transformation and, if necessary, scalar quantization of second error vectors after m-number of bases have been used. Further, when this is carried out, the second error vectors are scalar-quantized by the quantization coefficients $Q_{yk}$ conforming to the remaining number of bases yk (=nk−m), and these are coded to an amount of code equivalent to the remaining number yk of bases. As a result, only image quality is increased and not the total amount of code per pixel block. In addition, code length per pixel block can be put into easily decodable form (a multiple of a prescribed number of bits), thereby making it possible to greatly reduce computation load at the time of decoding.

An image coding/decoding method according to claim (5) of the present invention based upon the arrangement shown in FIG. 1(B) is such that on the basis of a total of five items of DC image data of upper, bottom, left, right blocks U, B, L, R inclusive of a local block S comprising a block mean value of K×K pixels, items of pixel data $P_1 \sim P_4$ of (K/2)×(K/2) pixels of a first sub-block $S_1$ at the upper left of the local block S are obtained in accordance with the following equations:

$$P_1=S+(2U+2L-2S-B-R)/8$$

$$P_2=S+(2U-B-R)/8$$

$$P_3=S+(2L-B-R)/8$$

$$P_4=S+(2S-B-R)/8$$

items of pixel data $P_1 \sim P_4$ of pixels (K/2)×(K/2) of a second sub-block $S_2$ at the upper right of the local block S are obtained in accordance with the following equations:

$$P_1=S+(2U-B-L)/8$$

$$P_2=S+(2U+2R-2S-B-L)/8$$

$$P_3=S+(2S-B-L)/8$$

$$P_4=S+(2R-B-L)/8$$

items of pixel data $P_1 \sim P_4$ of pixels (K/2)×(K/2) of a third sub-block $S_3$ at the lower left of the local block S are obtained in accordance with the following equations:

$$P_1=S+(2L-U-R)/8$$

$$P_2=S+(2S-U-R)/8$$

$$P_3=S+(2B+2L-2S-U-R)/8$$

$$P_4=S+(2B-U-R)/8$$

and/or items of pixel data $P_1 \sim P_4$ of pixels (K/2)×(K/2) of a fourth sub-block $S_4$ at the lower right of the local block S are obtained in accordance with the following equations:

$$P_1=S+(2S-U-L)/8$$

$$P_2=S+(2R-U-L)/8$$

$$P_3 = S + (2B - U - L)/8$$

$$P_4 = S + (2B + 2R - 2S - U - L)/8$$

In claim (5) of the present invention, CPU and memory load are greatly alleviated at the time of image coding/decoding by virtue of the arrangement in which image data of K×K pixels in the local block S is obtained directly in-stepless fashion from the neighboring DC image data S, U, B, L, R inclusive of the local block. It should be noted that the method of claim (5) of the present invention can be utilized in the prediction of AC components at the time of image coding and in the reproduction of AC components at the time of image decoding.

Further, a recording medium according to claim (6) of the present invention is a computer-readable recording medium on which has been recorded a program for causing a computer to execute the processing described in any one of claims (1) to (5) of the present invention.

BRIEF DESCRIPTION OF THE DRAWINGS

FIG. 1 is a diagram for describing the principles of the present invention;

FIG. 8 is a diagram for describing a table in image coding processing according to an embodiment;

FIG. 9 is a conceptual view (1) of image coding processing according to an embodiment;

FIG. 10 is a conceptual view (2) of image coding processing according to an embodiment;

FIG. 11 is a conceptual view (3) of image coding processing according to an embodiment;

FIG. 12 is a conceptual view (4) of image coding processing according to an embodiment;

FIG. 14 is a conceptual view of direct AC component prediction processing according to an embodiment;

FIG. 15 is a graph of coding efficiency according to an embodiment;

FIG. 16 is a diagram (1) for describing the prior art; and

FIG. 17 is a diagram (2) for describing the prior art.

BEST MODE FOR CARRYING OUT THE INVENTION

Figure 2:
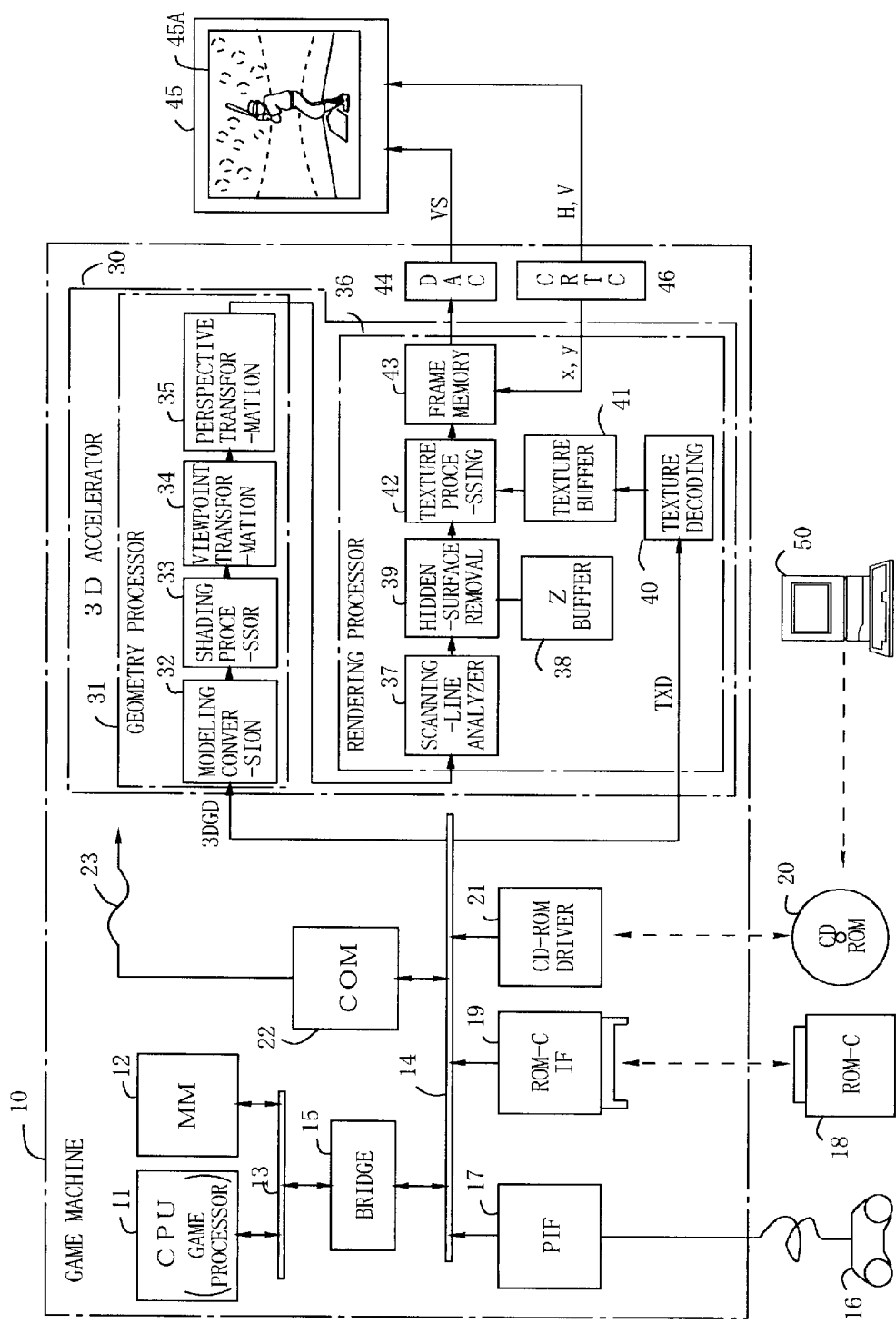
FIG. 2 is a diagram showing the construction of an image coding/decoding system according to an embodiment.

A preferred embodiment of the present invention will now be described in detail in accordance with the accompanying drawings. It should be noted that identical reference characters indicate identical or corresponding components throughout the drawings.

FIG. 2 is a diagram showing the construction of an image coding/decoding system according to an embodiment and illustrating an example of application to a game machine.

Shown in FIG. 2 are a game machine 10 proper; a CPU (game processor) 11 for performing main control of the game machine (such as control for reading in a game program, 3D CG and texture data TXD and control for reading in data resulting from manipulation of the game by a user) and for executing game processing (such as processing for moving game characters) related to 3D CG animation; a main memory (MM) 12 comprising a RAM, ROM or EEPROM, etc., used by the CPU 11; a local (host) bus 13 of the CPU 11; a bus 14 capable of transferring data at high speed; a bridge 15 for controlling connection between the buses (and for controlling contention arbitration); a control pad 16 having various control keys (a start key, a select key and a cross-hair key, etc.) for controlling the game and setting parameters, as well as position input means such as a mouse and joystick; a peripheral interface (PIF) 17 through which the control pad 16 is accommodated in the game system; a ROM cartridge (ROM-C) 18 in which a game program (a processing procedure, game parameters, 3D CG model data, texture data, etc.) has been recorded on a mask ROM or the like; a ROM-cartridge interface (ROM-CIF) 19 that makes it possible to removably accommodate the ROM cartridge 18 in the game system; a compact disk ROM (CD-ROM) 20 on which the game program has been recorded; a CD-ROM driver 21 that makes it possible to removably accommodate the CD-ROM 20 in the game system and to drive the CD-ROM; a communication controller (COM) 22 which connects the system to a public network (not shown) in order to achieve the online downloading of game programs and to play games with other game machines; and a communication line 23.

Also shown are a 3D accelerator 30 for subjecting input 3D CG model data to a perspective transformation on a 2D screen; a geometry processor 31; a modeling converter 32 for generating and expanding a 3D CG model of actual size comprising a set of polygons or the like at corresponding positions in 3D space in accordance with reference position data of characters and background, etc., and the shape model data thereof; a shading processor 33 for subjecting the generated model to shading that takes light (sunlight, illumination light, etc.) into consideration; a viewpoint transformation unit 34 for converting 3D CG image data in a world coordinate system XYZ to 3D CG image data in a viewpoint coordinate system xyz that is in accordance with camera viewpoint information; and a perspective transformation unit 35 for performing a perspective transformation of a generated 3D CG model in accordance with camera viewpoint information (viewpoint coordinate system xyz).

Also shown are a rendering (raster) processor 36 for executing processing synchronized to a display raster; a scanning-line analyzer 37 for extracting each item of pixel data after a perspective transformation in accordance with a scanning-line address x, y of a CRT 45; a Z buffer 38; a hidden-surface removal unit 39 which uses the Z buffer 38 to replace pixel data of a portion which should not be visible on a screen 45A by pixel data of a portion which can be seen on the screen 45A; a texture decoder 40 for decompressing (decoding) a compressed texture data input in accordance with the present invention; a texture buffer 41 for temporarily storing texture data; a texture processor 42 for pasting corresponding items of texture data in the texture buffer 41 onto each item of pixel data of the portion that can be seen on the screen 45A; a frame memory 43 for storing output color image data (R, G, B); a D/A converter (DAC) 44 for converting color pixel data in the frame memory 43 to an analog pixel signal to supply the CRT 45 with a video signal VS; a color CRT monitor 45, for example, serving as a display unit; the display screen 45A of the monitor; and a CRT controller (CRTC) 46 for generating horizontal and vertical synchronizing signals H, V of the CRT 45 and x, y synchronizing-signals of the 3D accelerator 30.

Furthermore, an external game creation unit 50 creates a game program (processing procedure, game parameters, 3D CG model data, texture data, etc.) and records the game program in the ROM cartridge 18 or CD-ROM 20. When texture data is created, the image coding scheme according to the present invention is executed and texture data TXD that has undergone image compression is recorded in the ROM cartridge 18 or CD-ROM 20. The texture data TXD that has undergone image compression is decoded at high speed by the texture decoder 40, pasted to a 2D perspective image and displayed on the screen 45A. Image coding (compression) processing in the game creation unit 50 will be described below.

FIGS. 3 to 7 are flowcharts (1)~(5) of image coding processing according to this embodiment, FIG. 8 is a diagram for describing a table in this image coding processing, and FIGS. 9~12 are conceptual views (1)~(4) of this image coding processing. The details of image coding processing will be described with reference to these drawings.

Throughout the specification, the symbols "< >", "|| ||", "·" and "[operation]" represent a vector, the magnitude of a vector, the inner product of vectors and the fact that the result of computation is made a whole number, respectively. However, in a case where the symbol "[operation]" is used in a different sense, a supplementary note will be attached to this effect. Further, vectors in diagrams and equations are represented by bold characters.

In the flowcharts, the size of an original image is taken to be n pixels horizontally and m pixels vertically. Further, the symbol $T_{m,n}$ represents partial image data obtained by extracting a square block of 4×4 pixels from m rows and n columns of an image T, and the symbol $B_{y,x,sy,sx}$ represents a block obtained by extracting data of 4×4, for a total of 16, pixels at steps of sx in the horizontal direction and sy in the vertical direction from y rows and columns of a DC image.

Figure 3:
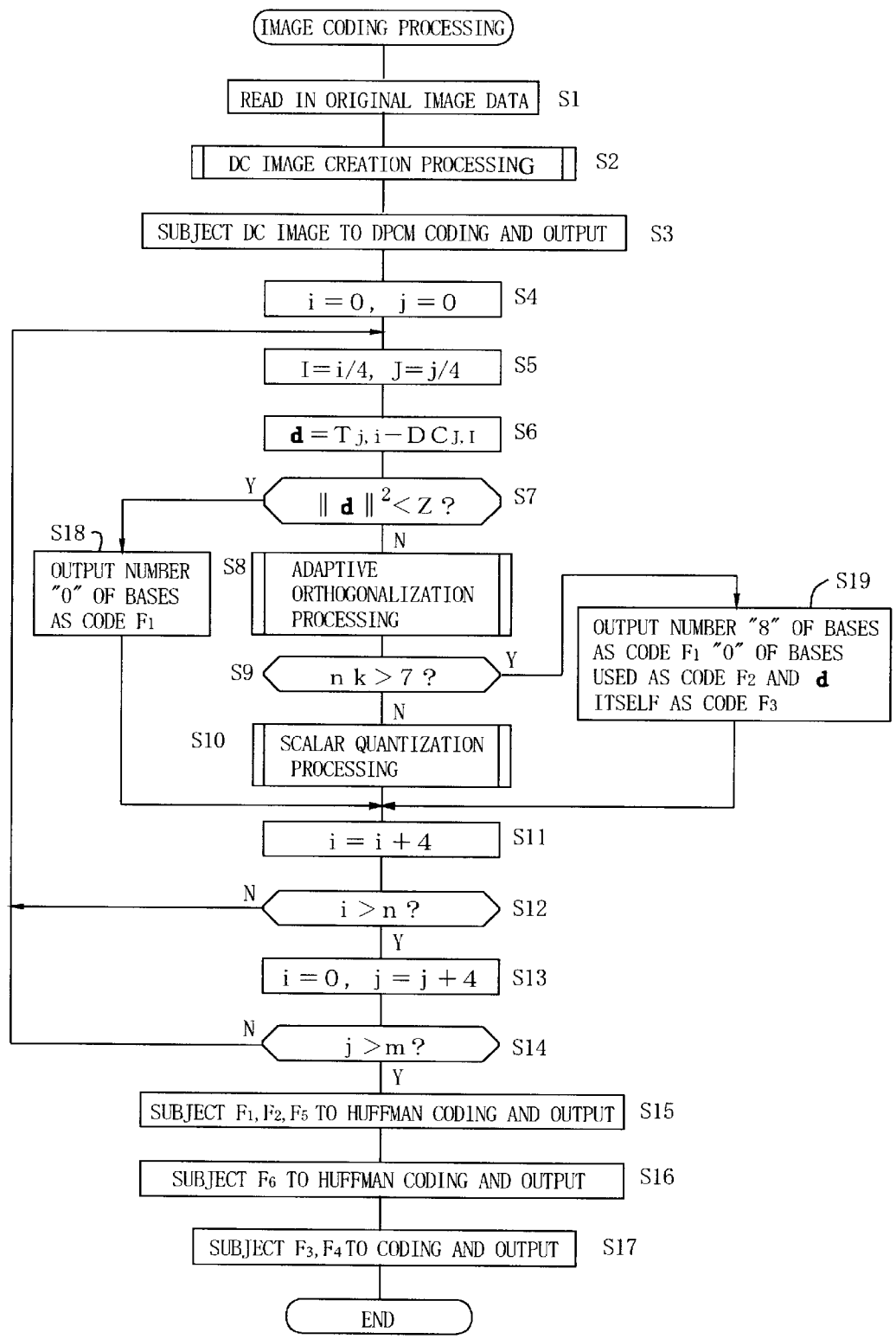
FIG. 3 is a flowchart (1) of image coding processing according to an embodiment.

FIG. 3 illustrates the main processing of the image coding processing.

Original image data is read in at step S1.

FIG. 9(A) illustrates the concept of original image data. An image of interest in the RGB system is read in upon being converted to an image in the YUV system. Here Y corresponds to luminance data and U, V to color difference data, wherein U, V are downsampled using 2-pixel luminance averaging in the horizontal direction. The luminance data Y in this example comprises 960 pixels vertically×1280 pixels horizontally, and U, V each comprise 960 pixels vertically×640 pixels horizontally. By way of example, eight bits are allocated to each item of pixel data of Y, U and V.

Though the focus of the description below is the processing of the luminance data Y, it should be noted that U, V can be processed in the same manner.

With reference again to FIG. 3, DC-image creation processing is executed at step S2. This DC-image creation processing is processing for dividing the original image into blocks of 4×4 pixels each and creating a DC image comprising mean values M of respective ones of the blocks.

Figure 4:
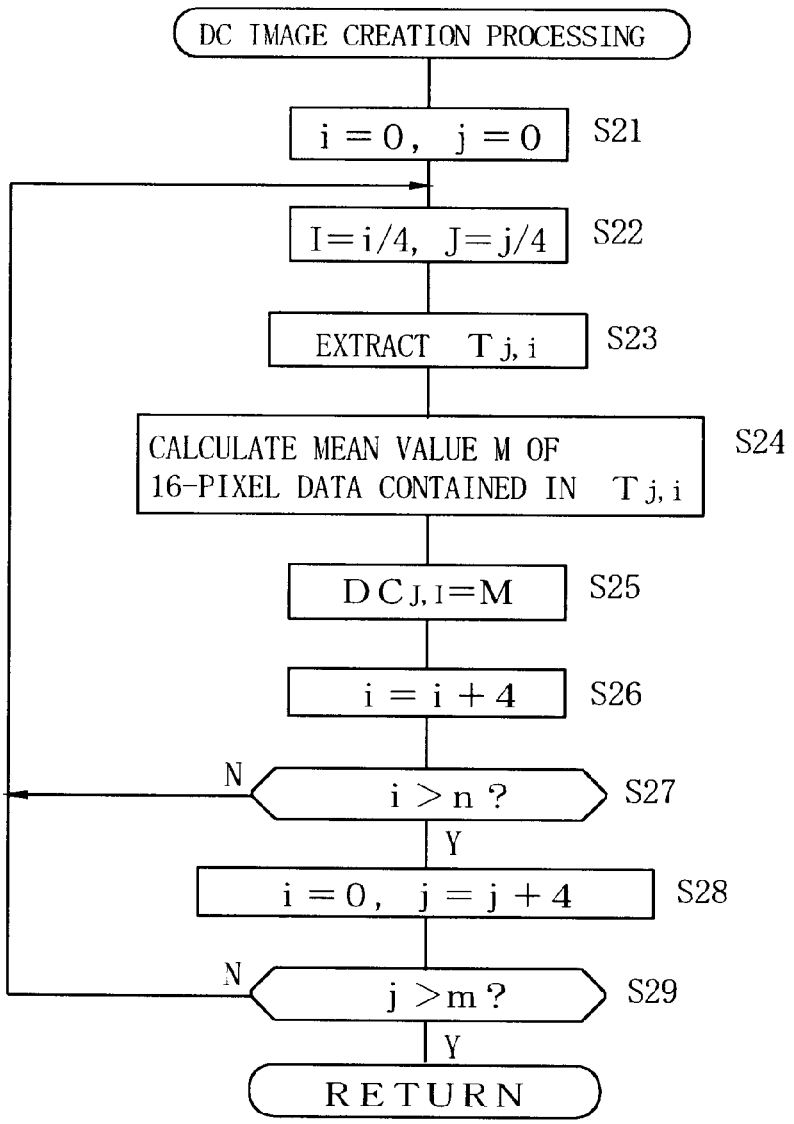
FIG. 4 is a flowchart (2) of image coding processing according to an embodiment.

FIG. 4 is a flowchart of DC-image creation processing. Items of address data i,j of the original image are both initialized to "0" at step S21. At step S22, i/4, j/4 are set in DC-image address registers I, J. Block data $T_{j,i}$ of 4×4 pixels is extracted from the original image at step S23. The mean value M of the 16 items of pixel data contained in the block data $T_{j,i}$ is found at step S24. The mean value M is stored at a DC-image storage location $DC_{J,I}$ at step S25. The operation i=i+4 is performed at step S26, and it is determined at step S27 whether i>n holds. If i>n does not hold, control returns to step S22. Now the mean value M of the block data $T_{j,i}$ of the next column is found and this is stored at $DC_{J,I}$ of the next column. Control thenceforth proceeds in the same manner. When it is finally found that i>n holds at the discrimination of step S27, i is initialized to "0" and the operation j=j+4 is performed at step S28. It is then determined at step S29 whether j>m holds. If j>m does not hold, control returns to step S22. Now the mean value M of the block data $T_{j,i}$ of the next row is found and this is stored at $DC_{J,I}$ of the next row. Control thenceforth proceeds in the same manner. When it is finally found that j>m holds at the discrimination of step S29, this processing is exited.

FIG. 9(B) illustrates the concept of the DC image data DC. The DC image of this example comprises 240 DC values vertically×320 DC values horizontally.

With reference again to FIG. 3, the DC image is output upon being coded by two-dimensional DPCM at step S3.

FIG. 10(A) illustrates the concept of two-dimensional DPCM processing. Let the DC value of row J, column I of the DC image be $DC_{J,I}$. By way of example, a predicted value $DC'_{J,I}$ of $DC_{J,I}$ is found by $DC'_{J,I}=(DC_{J,I-1}+DC_{J-1,I})/2$, the predicted error thereof $\Delta DC_{J,I}=DC_{J,I}-DC'_{J,I}$ is scalar-quantized by a quantization coefficient $Q_S$ {that is, $[\Delta DC_{J,I}/Q_S]$} and the result is output. It should be noted that the symbol [a] in this case represents the result of rounding off a real number a. Furthermore, run length is taken into consideration only in a case where the predicted error $\Delta DC_{J,I}$ is "0", with the predicted error $\Delta DC_{J,I}$ and run length being Huffman-coded independently.

FIG. 8(A) illustrates a table of quantization coefficients $Q_S$. The values of the quantization coefficients $Q_S$ are correlated with allowable errors Z of multiple stages. The user selects the allowable error Z within a small range when high image quality is required and within a large range when low image quality is acceptable. In accordance with the selection, the quantization coefficient $Q_S$ will vary over a range of from 1 to 8.

With reference again to FIG. 3, the address registers i,j of the original image are both initialized to "0" at step S4, and i/4, j/4 are set in the address registers I, J of the DC image at step S5. A 16-dimension residual vector <d> corresponding to a 4×4 pixel block is found in accordance with $$<d>=T_{j,i}-DC_{J,I}$$

at step S6.

FIG. 10(B) illustrates the concept of the residual vector <d>. Eight bits are allocated to each element of the residual vector <d>.

With reference again to FIG. 3, it is determined at step S7 whether the magnitude (the square) of the residual vector <d> is less than the allowable error Z. If it is less, this means that the block image data $T_{J,I}$ of this portion can be reconstructed with high precision on the decoding side by the direct method of AC component prediction, described later. Accordingly, control proceeds to step S18, at which the number "0" of bases is output as the code $F_1$. If the residual vector is not less than the allowable error, then control proceeds to step S8, where adaptive orthogonalization processing is executed for the purpose of searching for base vectors that approximate the residual vector <d>.

FIG. 11 illustrates the concept of adaptive orthogonalization processing. Adaptive orthogonalization processing is processing for finding the number nk of base vectors and each base vector $<v_{nk}>$ necessary to approximate the residual vector $<d>$ within the allowable approximation error Z. In this embodiment, a portion of a DC image, which has been obtained by compressing the original image at a ratio of 1:K (e.g., K=4) in both the vertical and horizontal directions, is extracted and used as a nest to thereby lighten the nest. in FIG. 11(A), an area of, e.g., 39 DC values vertically×71 DC values horizontally is extracted from the DC image and adopted as a nest. The search for a base vector $<v_{nk}>$ involves setting vertex (x,y) ∈ [0,63]×[0,31] for every DC value vertically and horizontally and adopting a total of four types of subsampling intervals, i.e., (sx,sy) ∈ {(1,1), (1,2), (2,1), (2,2)}. This is just one example; the size of the nest, the position at which it is extracted and the subsampling intervals of the base vectors can be set at will.

FIG. 11(B) illustrates a state in which DC values obtained by sampling the nest using various patterns are gathered in a 4×4 storage area of the base vector $<v_{nk}>$. That is, 4×4 DC values are gathered from a 4×4 area of the nest when (sx,sy)=(1,1) holds, DC values are gathered from an area of the nest extended in the y direction when (sx,sy)=(1,2) holds, DC values are gathered from an area of the nest extended in the x direction when (sx,sy)=(2,1) holds, and DC values are gathered from an area of the nest extended in both the x and y directions when (sx,sy)=(2,2) holds. These values are stored in the storage area of the base vector $<v_{nk}>$. This is processing which utilizes the autosimilarity possessed by the original image to find, from the DC image in the nest, images that resemble the pixel blocks of the original image at various angles.

Figure 5:
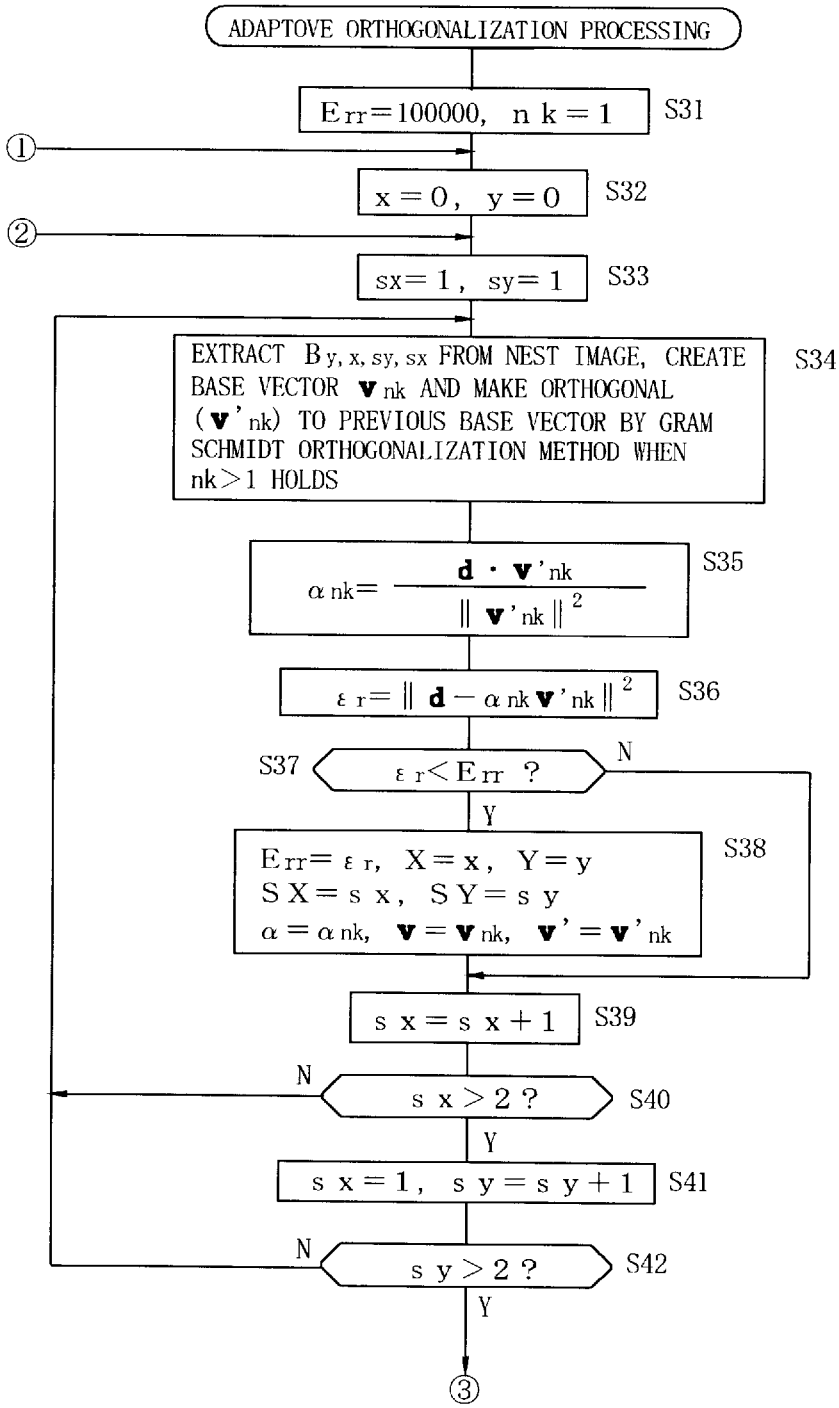
FIG. 5 is a flowchart (3) of image coding processing according to an embodiment.
Figure 6:
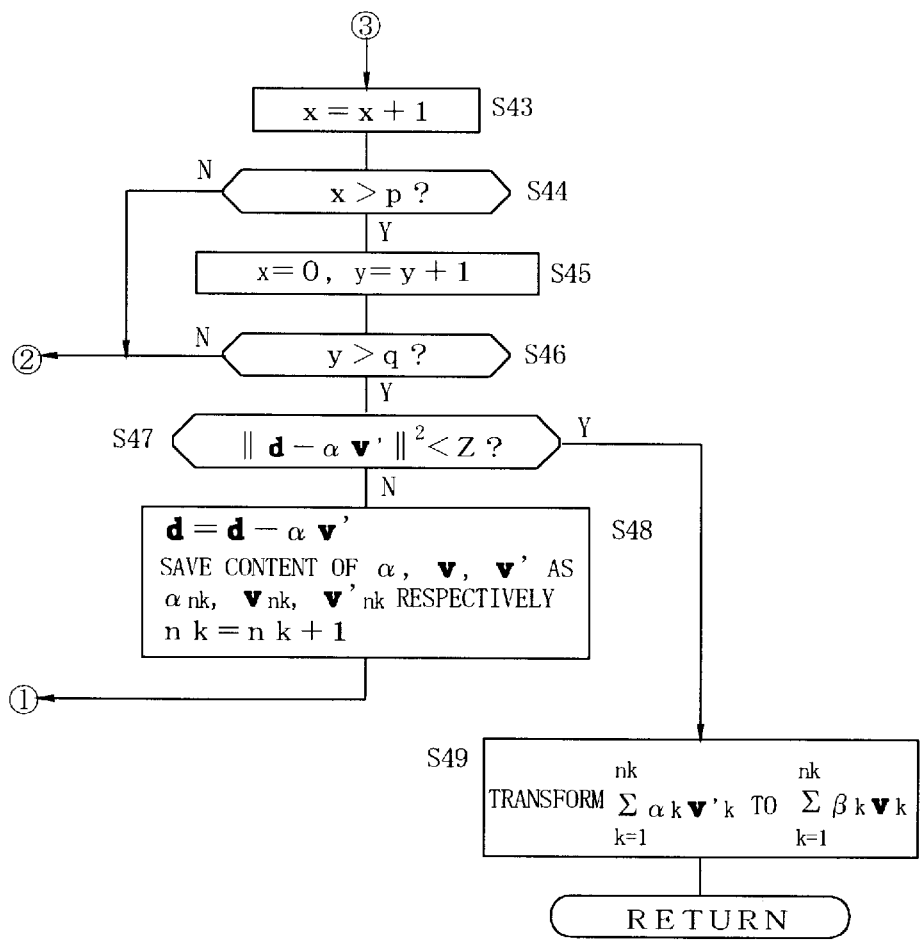
FIG. 6 is a flowchart (4) of image coding processing according to an embodiment.

FIGS. 5 and 6 are flowcharts of adaptive orthogonalization processing according to this embodiment.

At step S31 in FIG. 5, a large value (e.g., 100000) is set in an error register $E_{rr}$ and a base-number register nk is initialized to "1", starting-address registers x, y of the nest image are both initialized to "0" at step S32, and subsample-interval registers sx, sy of the nest image are both initialized to "1" at step S33.

At step S34, a 4×4 DC block image $B_{y,x,sy,sx}$ is extracted from the nest image to create the base vector $<v_{nk}>$ {which corresponds to $<u_{nk}>$ in FIG. 11(C), described later}, and in a case where nk>1 holds, this vector is made orthogonal to the previous base vector by Gram Schmidt orthogonalization.

The Gram Schmidt Orthogonalization Method is a method of forming, from one base $\{v_1, \ldots, v_n\}$ of n-dimensional inner-product space V, a normal orthogonal base ($\{v'_1, \ldots, v'_n\}$ of V. The Gram Schmidt Orthogonalization Method will be described in brief with reference to FIG. 11(C). Let a first base vector be represented by $<v_1>$ (where this corresponds to $<u_1>$). Since a first normalized base vector $<v'_1>$ is a unit vector, it can be replaced by $$v'_1 = \frac{v_1}{\|v_1\|} = a_{11}u_1$$

Next, when a second base vector $<u_2>$ is extracted from the nest image, a second orthogonal base vector $<v_2>$ that is orthogonal to the first normalized base vector $<v'_1>$ can be replaced temporarily by $$v_2 = u_2 + kv'_1$$

whereupon the following relation is obtained from $<v_2>\cdot<v'_1>=0$:

$$v_2 \cdot v'_1 = (u_2 + kv'_1) \cdot v'_1 = u_2 \cdot v'_1 + k(v'_1 \cdot v'_1) = u_2 \cdot v'_1 + k = 0$$

The scalar coefficient k in this case is $$k = -(u_2 \cdot v'_1)$$

If the coefficient k is substituted into the above equation, then the second orthogonal base vector $<v_2>$ can be expressed as follows:

$$v_2 = u_2 - (u_2 \cdot v'_1)v'_1$$

Since a second normalized base vector $<v'_2>$ also is a unit vector, we have $$v'_2 = \frac{v_2}{\|v_2\|} = \frac{u_2 - (u_2 \cdot v'_1)v'_1}{\|u_2 - (u_2 \cdot v'_1)v'_1\|} = a_{21}u_1 + a_{22}u_2$$

In similar fashion, an nth normalized base vector $<v'_n>$ is expressed as follows in general:

$$v'_n = \frac{v_n}{\|v_n\|} = \frac{u_n - (u_n \cdot v'_1)v'_1 \to \cdot \leftarrow (u_n \cdot v'_{n-1})v'_{n-1}}{\|u_n - (u_n \cdot v'_1)v'_1 \to \cdot \leftarrow (u_n \cdot v'_{n-1})v'_{n-1}\|} = \sum_{i=1}^{n} a_{ni}u_i$$

Using the normalized base vector $<v'_{nk}>$, step S35 finds a base-vector expansion coefficient $\alpha_{nk}$ that will minimize the distance to the residual vector $<d>$.

The concept of processing for approximating the residual vector $<d>$ using the normalized base vector $<v'_{nk}>$ is illustrated at (a) in FIG. 12(A). In (a) of FIG. 12A, the magnitude of a difference vector $\{<d>-\alpha_{nk}<v'_{nk}>\}$ between the residual vector $<d>$ and a base vector $\alpha_{nk}<v'_{nk}>$ that has been multiplied by the expansion coefficient $\alpha_{nk}$ is minimum when the base vector $\alpha_{nk}<v'_{nk}>$ and difference vector $\{<d>-\alpha_{nk}<v'_{nk}>\}$ are orthogonal (inner product=0). Therefore, the expansion coefficient $\alpha_{nk}$ of the normalized base vector $<v'_{nk}>$ is found in accordance with the following equations:

$$(d - \alpha_{nk}v'_{nk}) \cdot \alpha_{nk}v'_{nk} = 0$$

$$\alpha_{nk}d \cdot v'_{nk} - \alpha_{nk}^2 v'_{nk} \cdot v'_{nk} = 0$$

$$\alpha_{nk} = \frac{d \cdot v'_{nk}}{\|v'_{nk}\|^2}$$

A description of (b) in FIG. 12(A) will be given later.

With reference again to FIG. 5, the magnitude $\epsilon_r$ of an error vector which prevails when the residual vector $<d>$ is approximated by the base vector $\alpha_{nk}<v'_{nk}>$ is obtained at step S36. It is determined at step S37 whether $\epsilon_r<E_{rr}$ holds. If $\epsilon_r<E_{rr}$ holds, at step S38 the $\epsilon_r$, x, y, sx, sy prevailing at this time are retained in registers $E_{rr}$, X, Y, SX, SY for storing various information relating to the minimum value of $\epsilon_r$. Further, the expansion coefficient $\alpha_{nk}$ at this time is stored in a register $\alpha$, the base vector $<v_{nk}>$ at this time is stored in a base-vector storage area v, and the orthogonalized base vector $<v'_{nk}>$ at this time is stored in the storage area v' of the orthogonalized base vector. Further, if $\epsilon_r<E_{rr}$ does not hold, the processing of step S38 is skipped.

The operation sx=sx+1 is performed at step S39 and it is determined at step S40 whether sx>2 holds. If sx>2 does not hold, control returns to step 34. Now the above-described processing is executed with regard to a base vector $<v_{nk}>$ that has been extracted at a different sampling interval sx. Processing thenceforth proceeds in similar fashion. When sx>2 is finally found to hold at the discrimination step S40, sx is initialized to "1" and the sampling interval sy is incremented by +1 at step S41. It is determined at step S42 whether sy>2 holds. If sy>2 does not hold, control returns to step S34. Now the above-described processing is executed with regard to a base vector $<v_{nk}>$ that has been extracted at a different sampling interval sy. Processing thenceforth proceeds in similar fashion. When sy>2 is finally found to hold at the discrimination step S41, base vectors $<v_{nk}>$ of a total of four types having different sampling intervals (sx, sy)=(1,1),(1,2),(2,1),(2,2) will have been tried with regard to the starting position (x,y)=(0,0) of the nest image. Program then proceeds to step S43 in FIG. 6.

The starting position x of the nest is incremented by +1 at step S43 and it is determined at step S44 whether x>p (e.g., p=63) holds. If x>p does not hold, control returns to step S33 (②). Now processing similar to the above is executed with regard to each base vector $<v_{nk}>$ of a starting position shifted by one DC value in the x direction. Processing thenceforth proceeds in similar fashion. When x>p is finally found to hold at the discrimination step S44, the starting position x is initialized to "0" and the starting position y is incremented by +1 at step S45. It is then determined at step S46 whether y>q (e.g., q=31) holds. If y>q does not hold, control returns to step S33 (②). Now processing similar to the above is executed with regard to each base vector $<v_{nk}>$ of a starting position shifted by one DC value in the y direction. Processing thenceforth proceeds in similar fashion. When y>q is finally found to hold at the discrimination step S46, base vectors $<v_{nk}>$ of all sampling intervals (sx,sy) $\in\{(1,1),(1,2),(2,1),(2,2)\}$ will have been tried with regard to all starting positions (x,y) $\in[0,63]\times[0,31]$ of the nest image. Control then proceeds to step S47.

At step S47 the orthogonal base vector $\alpha<v'>$ that has been shifted by the minimum approximation error $\epsilon_r$ is subtracted from the residual vector $<d>$ to find the size (magnitude) of the error, and it is determined whether this size is less than the allowable error Z. If it is not less, then, at step S48, the residual vector $<d>$ is updated by being replaced by $\{<d>-\alpha<v'>\}$. Further, the orthogonal base vector $\alpha<v'>$ that has been shifted by the minimum approximation error $\epsilon_r$, the content of the base vector $<v>$ and the content of the orthogonalized base vector $<v'>$ are saved in the storage area as $\alpha_{nk}$, $<v_{nk}>$, $<v'_{nk}>$, respectively. It should be noted that when nk=1 holds, $\alpha_1$, $<v_1>$, $<v'_1>$ are saved. Further, nk is incremented by +1 and control returns to step 32 (①).

Processing thenceforth proceeds in similar fashion. When it is finally found at the discrimination step S47 that the approximation residual is less than the allowable value Z, control proceeds to step S49, where a vector comprising a linear combination of orthogonalized base vectors $\alpha_{nk}<v'_{nk}>$ (where nk=1, 2, ...) is transformed to a vector comprising a linear combination of base vectors $\beta_{nk}<v_{nk}>$ {which correspond to the base vectors $<u_{nk}>$ of FIG. 11(C)}. The coefficient $\beta$ will be referred to as the expansion coefficient of the base vector $<v>$ below.

The transformation method of step S49 will now be described in detail. Assume that k=1~nk holds and let V represent a matrix comprising base vectors $<v_k>$ {which correspond to the base vector $<u_k>$ of FIG. 11(C)}, let B represent a matrix comprising scalar expansion coefficients $\beta_k$, let V' represent a matrix comprising normalized orthogonal base vectors $<v'_k>$ and let A represent a matrix comprising scalar coefficients $\alpha_k$. If these are replaced respectively by $$V = [v_1, v_2, \ldots, v_{nk}] \quad B = \begin{bmatrix} \beta_1 \\ \beta_2 \\ \vdots \\ \beta_{nk} \end{bmatrix} \quad V' = [v'_1, v'_2, \ldots, v'_{nk}] \quad A = \begin{bmatrix} \alpha_1 \\ \alpha_2 \\ \vdots \\ \alpha_{nk} \end{bmatrix}$$

the transformation of step S49 will be obtained by making the replacement $$VB = V'A$$

In order to solve this with regard to the matrix B, first the matrix V is multiplied by a matrix $V^T$ (where $V^T$ represents a transposed matrix of V) from the left for the purpose of transforming the matrix V to a square matrix, thereby obtaining $$V^T V B = V^T V' A$$

This matrix ($V^T V$) is expanded in the manner $$V^T V = \begin{bmatrix} v_1 \\ v_2 \\ \vdots \\ v_{nk} \end{bmatrix} [v_1, v_2, \ldots, v_{nk}] = \begin{bmatrix} v_1 \cdot v_1 & v_1 \cdot v_2 & \cdots & v_1 \cdot v_{nk} \\ v_2 \cdot v_1 & v_2 \cdot v_2 & \cdots & v_2 \cdot v_{nk} \\ \vdots & \vdots & \vdots & \vdots \\ v_{nk} \cdot v_1 & v_{nk} \cdot v_2 & \cdots & v_{nk} \cdot v_{nk} \end{bmatrix}$$

where $<v_i>\cdot<v_j>$ represents the inner product and $<v_i>\cdot<v_j>=<v_j>\cdot<v_i>$ holds. A square matrix symmetrical with respect to diagonal elements is therefore obtained and $<v_i>$ is different from $<v_j>$. An inverse matrix therefore exists. Accordingly, multiplying by the inverse matrix $(V^TV)^{-1}$ of the matrix ($V^TV$) from the left, we obtain $$(V^TV)^{-1}V^TVB = B = (V^TV)^{-1}V^TV'A$$

Thus, this embodiment finds orthogonalized vectors $<V'_{nk}>$ of the minimum number nk necessary to approximate the error with respect to the residual vector $<d>$ in such a manner that the error will be less than the allowable value Z, then expresses these vectors by a linear combination of the original base vectors $<v_{nk}>$ ($=<u_{nk}>$), obtains the expansion coefficient $\beta_{nk}$ of each base vector $<v_{nk}>$ and codes these coefficients. By virtue of this arrangement, the design is such that Gram Schmidt orthogonalization computation is no longer required at the time of decoding. Further, normalization of the norm to 1 also is eliminated.

The concept of residual-vector approximation in a case where number of bases nk=3 holds is illustrated at (b) of FIG. 12(A). Initially a first base vector $\alpha_1<v'_1>$ that will minimize the error $\epsilon_r$ with respect to the residual vector $<d>$ is found. Next, a second orthogonalized base vector $\alpha_2<v'_2>$ that is orthogonal to this vector $<v'^1>$ and that will minimize the error $\epsilon_r$ with respect to an updated remaining residual vector $<d'>$ is found. Next, a third orthogonalized base vector $\alpha_3<v'_3>$ that is orthogonal to this vector $<v'_2>$ and that will minimize the error $\epsilon_r$ with respect to an updated remaining residual vector $<d''>$ is found.

With reference again to FIG. 3, it is determined at step S9 whether the number of bases used nk>7 holds. If nk>7 (8 or greater) holds, there is no advantage in performing image compression even if base vectors are used. Accordingly, control proceeds to step S19, where the number "8" of bases is output as a code $F_1$, the number "0" of bases used is output as a code $F_2$ and the residual vector $<d>$ itself is output as a code $F_3$. In case of nk≦7, control proceeds to step S10, at which scalar quantization processing set forth below is executed conjointly with use of the above-mentioned base vectors.

In scalar quantization processing, error vectors $<d_m>$ in a case where m (0≦m≦nk) bases have been adopted in a selected order among the selected number nk are found in accordance with $$d_m = d - \sum_{i=1}^{m} \beta_i v_i$$

The summation $$\sum_{i=1}^{m} \beta_i v_i$$

for the case where m=0 holds represents a zero vector. Furthermore, the error vectors $<d_m>$ are scalar-quantized by amount of code corresponding to a remaining number of bases yk=nk−m not adopted. That is, the error vectors $<d_m>$ are scalar-quantized by quantization coefficients $Q_{yk}$ which correspond to the remaining number yk of bases, and these values are clipped in the region of values $[-2^{yk-1}, 2^{yk-1}-1]$.

It should be noted that error vectors $<d'_m>$ thus scalar-quantized and clipped will not necessarily be the same as the original error vectors $<d_m>$ after decoding. Accordingly, with regard to each m (m=1, 2, ..., nk), inverse-quantized residual vectors $<d''_m>$ are found beforehand by inverse-quantizing each quantized error vector $<d'_m>$ by the corresponding quantization coefficient $Q_{yk}$, an m that will minimize the error $\|<d_m>-<d''_m>\|$ is searched for, and code for a case where these m-number of bases have been adopted is eventually generated.

FIG. 8(B) illustrates a scalar quantization table.

In a case where nk 8 holds, number of remaining bases yk=7 holds when one base is used (m=1). In similar fashion, number of remaining bases yk=1 holds when seven bases are used (m=7).

Though the details will be given later, in this embodiment two bytes are used for code per base. If eight bases are used, therefore, the total code length with be 16 bytes. However, if there is capacity for 16 bytes, a 16-dimension residual vector $<d>$ can coded as is and, hence, there will be no advantage to be gained in executing adaptive orthogonal transformation. Accordingly, the number of bases used is within the range of 0~7 and, in conformity therewith, the number yk of remaining bases is 7~1.

Each quantization coefficient $Q_{yk}$ is determined beforehand in conformity with the remaining number yk of bases. Preferably, each quantization coefficient $Q_{yk}$ is selected in such a manner that the error vector $<d_m>$ will fall within an amount of code equivalent to the remaining number yk of bases.

In a case where number of remaining bases yk=1 holds, 16×1 bits can be used in scalar quantization of the error vector $<d_m>$. This is one bit of code per element of the error vector $<d_m>$. That is, in this case the error vector $<d_m>$ is scalar-quantized at $Q_{yk}=8$ and this value is clipped to $[-2^{1-1}, 2^{1-1}-1]=[-1, 0]$. By way of example, bit "0" of the code corresponds to magnitude "−1" and bit "1" corresponds to magnitude "0". Operation proceeds in similar fashion. Then, in a case where number of remaining bases yk=7 holds, 16×7 bits can be used in scalar quantization of the error vector $<d_m>$. This is seven bits of code per element of the error vector $<d_m>$. In this case the error vector $<d_m>$ is scalar-quantized at $Q_{yk}=2$ and this value is clipped to $[-2^{7-1}, 2^{7-1}-1]=[-64, 63]$. By thus making joint use of m-number of bases and scalar-quantized error, image quality can be improved without changing the amount of code. Further, since expansion coefficients β of a number equivalent to the remaining number yk of bases are unnecessary, there is a decrease in the slight amount of code.

Figure 7:
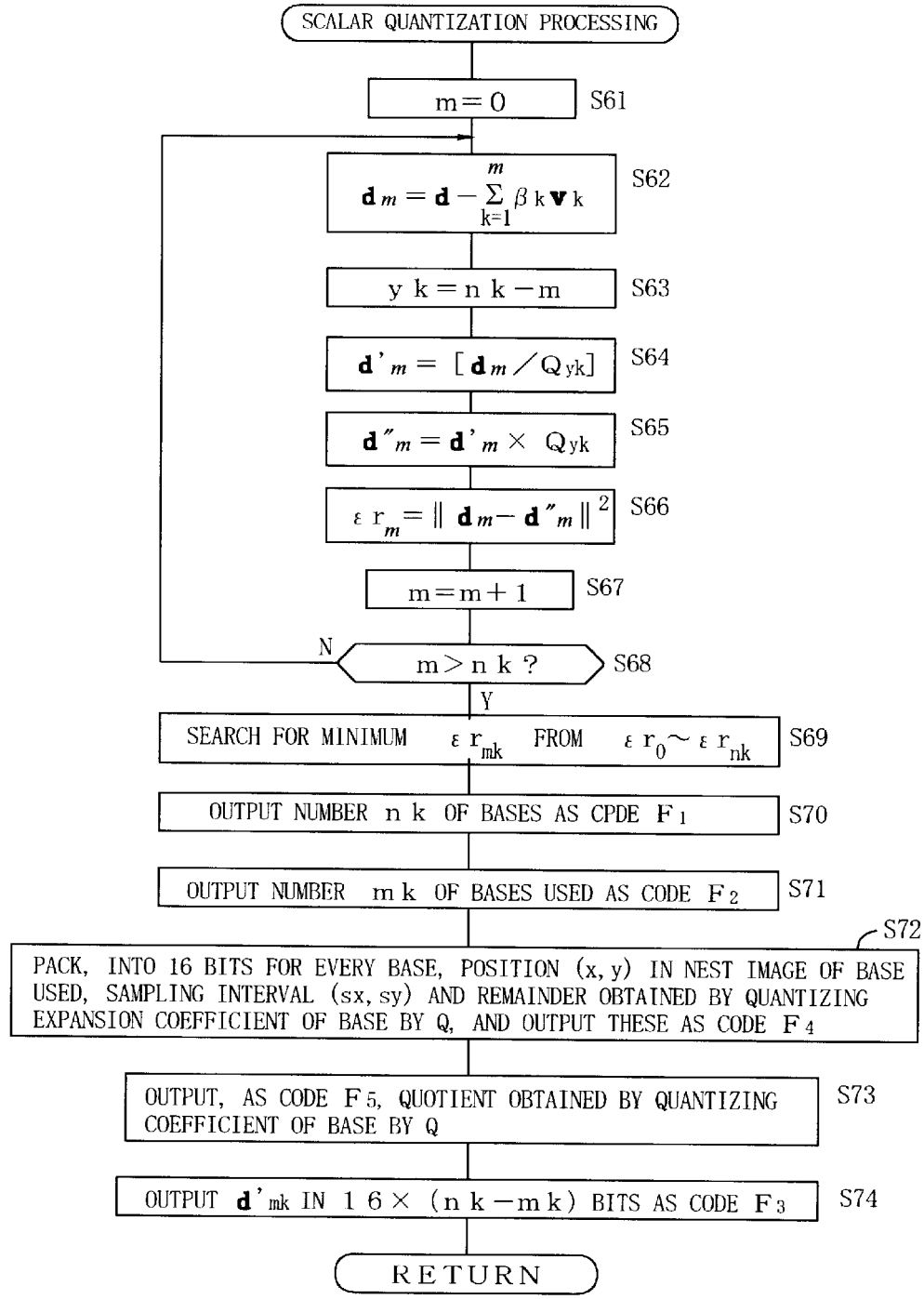
FIG. 7 is a flowchart (5) of image coding processing according to an embodiment.

FIG. 7 is a flowchart of scalar quantization processing. A register m for counting the number of bases used is initialized to "0" at step 61, and the error vector $<d_m>$ after adoption of m-number of bases is found at step S62. It should be noted that the Σ term represents a zero vector in a case where m=0 holds. More specifically, we have error vector $<d_0>=<d>$ (residual vector). The number yk of remaining bases not used in the current trial among the nk (1≦nk Σ≦7)-number thereof is found from yk=nk−m at step S63. The error vector $<d_m>$ is scalar-quantized by $Q_{yk}$ and each element of the resulting error vector $<d'_m>$ is clipped to the range $[-2^{yk-1}, 2y^{k-1}-1]$ at step S64.

The resulting error vector $<d'_m>$ (scalar-quantized and clipped) is subjected to scalar inverse quantization by the corresponding quantization coefficient $Q_{yk}$ at step S65. Error $\epsilon r_m$ at the time of comparing original error vector $<d_m>$ with said scalar inverse-quantized error vector $<d''_m>$ is calculated, and the error $\epsilon r_m$ is memorized to predetermined storage area at step S66. The register m is incremented by +1 at step S67 and it is determined at step S68 whether m>nk (1≦nk≦7) holds. If m>nk does not hold, control returns to step S62 and executes processing similar to the foregoing.

When it is eventually found at the discrimination step S68 that m>nk holds, errors $\epsilon r_0 \sim \epsilon r_{nk}$ in a case where m (m=0, 1, 2, 3, ..., nk)-number of bases have been adopted are found. The smallest error $\epsilon r_{mk}$ is extracted from among the errors $\epsilon r_0 \sim \epsilon r_{nk}$ at step S69, the number nk of bases is output as the code $F_1$ at step S70 and the number mk of bases used (the number of effective bases) is output as the code $F_2$ at step S71. The starting position (x,y), in the nest, of each base used, the subsampling interval (sx,sy) and the remainder obtained by quantizing the expansion coefficient β of each base used by Q (e.g., 8) are packed into 16 bits for every base and output as a code $F_4$ at step S72.

The breakdown of the code $F_4$ is as follows: six bits horizontally and five bits vertically, for a total of 11 bits, for the starting position (x,y) in the nest, two bits for the subsampling interval of any of four types, and three bits for the remainder of the expansion coefficient β, for a grand total of 16 bits. Accordingly, the code $F_4$ consumes two bytes for every base used.

The expansion coefficients β of the bases are quantized by Q (e.g., 8) and output its quotient as a code $F_5$ at step S73. Error vectors $<d'_{mk}>$ at minimum inverse quantization error $\epsilon r_{mk}$ are allocated to an area of 16×(nk−mk) bits equivalent to the remaining number yk of bases and are output as a code $F_3$. Processing is then exited.

With reference again to FIG. 3, coding of one residual vector $<d>$ of the original image is thus completed. The address register i is incremented by +4 at step S11 and it is determined at step S12 whether i>n holds. If i>n does not hold, control returns to step S5 and coding is performed by executing processing similar to the foregoing with regard to one residual vector $<d>$ from a position that has been shifted four bits along the i axis. Control thenceforth proceeds in the same manner. When it is finally found that i>n holds at the discrimination of step S12, i is initialized to "0" and the operation j=j+4 is performed at step S13. It is then determined at step S14 whether j>m holds. If j>m does not hold, control returns to step S5 and coding is performed by executing processing similar to the foregoing with regard to each residual vector $<d>$ shifted four bits along the j axis. Control thenceforth proceeds in the same manner. When it is finally found that j>m holds at the discrimination of step S14, the above-described coding processing ends for all residual vectors $<d>$ of the image.

FIG. 12(B) illustrates image compression code. This table will be referred to in the description given below.

With reference again to FIG. 3, the variable-length codes $F_1$, $F_2$, $F_5$ are Huffman coded and output at step S15. With regard to the number "nk" of bases of the code $F_1$, Huffman coding is performed taking run length into consideration only in the case of nk=0. A similar approach is adopted in regard to the number "mk" of bases used of the code $F_2$. With regard to the code $F_5$, the quotient obtained by quantizing the expansion coefficient β by the constant Q (e.g., 8) is Huffman coded. In a case where number of remaining bases yk≠0 holds, a code EOB for indicating changeover of the image block is written in.

The variable-length code $F_6$ is Huffman coded and output at step S16. The code $F_6$ is obtained by quantizing, by the quantization coefficient $Q_S$, the predicted residual $\Delta DC_{J,I}$ based upon two-dimensional DPCM of DC values. It should be noted that the predicted residual $\Delta DC_{J,I}$ and run length are Huffman coded independently of each other taking run length into consideration only in a case where predicted residual $\Delta DC_{J,I}=0$ holds.

The variable-length code $F_3$ and fixed-length code $F_4$ are Huffman coded and output at step S17. The code $F_3$ is obtained by scalar-quantizing, by $Q_{yk}$, the final error vector <$d'_{mk}$> in a case where number of bases used mk>0 holds [i.e., <$d'_{mk}$>/$Q_{yk}$]. In a case where number of bases used mk=0 holds, the original residual vector <d> itself is coded. The code F4 is fixed at a total of 16 bits per base, namely 11 bits for the starting coordinates (x,y) of the nest, two bits for the subsampling coefficients (sx,sy) and three bits for the remainder (β/Q) of the expansion coefficient β. These bits are packed in the order in which the bases used appear.

A code string is constructed as the overall code by packing code in the order of appearance in pixel block units. In actuality, the number nk of bases is around two in more than half the blocks and the small number of variable-length codes obtained are only the quotient which is the result of quantizing the expansion coefficient β of the base by Q, DPCM code of the DC image, the number "nk" of bases and the number "mk" of bases used.

Figure 13:
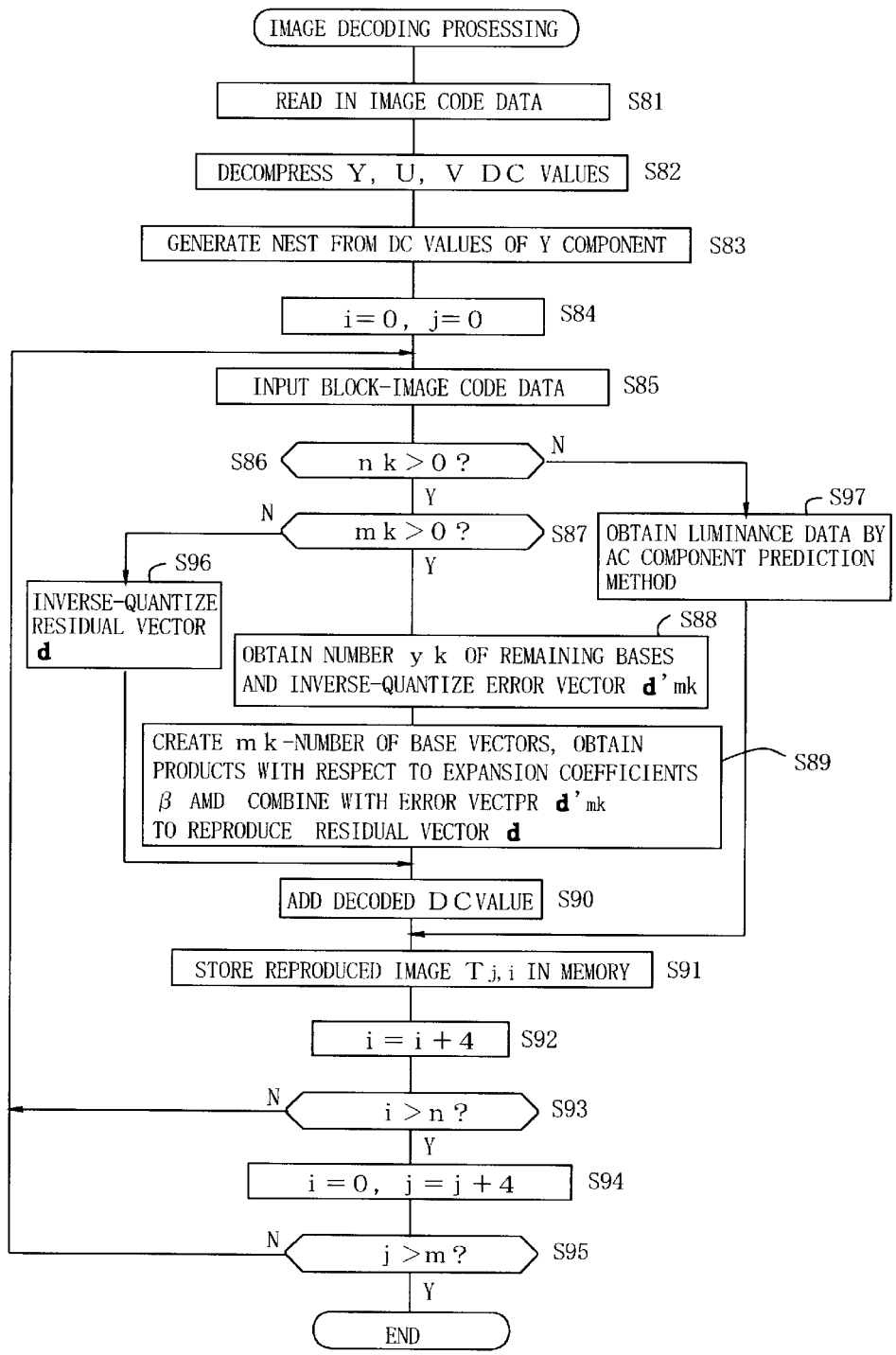
FIG. 13 is a flowchart of image decoding processing according to an embodiment.

FIG. 13 is a flowchart of image decoding processing according to this embodiment. Image code data is read in at step S81 and the DC values of Y, U, V are decompressed (decoded) at step S82. In this regard, a DC value $DC''_{J,I}$ that results from decoding is obtained in accordance with $DC''_{J,I}=DC'_{J,I}+[\Delta DC_{J,I}/Q_S]Q_S$, where $DC'_{J,I}$ represents a predicted value of DC on the decoding side and is given by $DC'_{J,I}=(DC''_{J,I-1}+DC''_{J-1,I})/2$. A nest is generated from the DC values of the Y component at step S83. The nest can be generated upon separately receiving starting-position and size information of the DC image. Address registers i, j of the decoded (reproduced) image are both initialized to "0" at step S84.

Code data relating to a block image (i.e., the residual vector) is input at step S85 and it is determined at step S86 whether number of bases nk>0 holds. If nk=0 holds, 16 pixels of luminance data is found by the direct method of AC component prediction (described later) at step S97. If nk>0 holds, it is determined at step S87 whether number of based used mk>0 holds.

If mk=0 holds, the residual vector <d> is inverse-quantized at step S96 and the decoded DC value is added to the obtained residual vector <d> at step S90. If mk>0 holds, the number yk of remaining bases (=nk−mk) is found and the error vector <$d'_{mk}$> is inverse-quantized by $Q_{yk}$ at step S88. Next, at step S89, mk-number of base vectors are created from the nest in accordance with the starting position (x,y) of each base and the subsampling interval (sx,sy), the products between the vectors and the expansion coefficients β are obtained, an approximation vector (orthogonal base system) comprising a linear combination of these products is formed and the error vector <$d'_{mk}$> is combined with the approximation vector to reproduce the original residual vector <d>. The decoded DC value is added to the obtained residual vector <d> at step S90. The 4×4 block image $T_{j,i}$ is thus reproduced by any method described above. The reproduced image $T_{j,i}$ is stored in an image memory at step S91.

The address register is incremented by +4 at step S92 and it is determined at step S93 whether i>n holds. If i>n does not hold, control returns to step S85. Now the block image data $T_{j,i}$ of the next column is decoded and stored in the image memory. Control thenceforth proceeds in the same manner. When it is finally found that i>n holds at the discrimination of step S93, i is initialized to "0" and the operation j=j+4 is performed at step S94. It is then determined at step S95 whether j>m holds. If j>m does not hold, control returns to step S85. Now each item of block data $T_{j,i}$ of the next row is decoded and stored in the image memory. Control thenceforth proceeds in the same manner. When it is finally found that j>m holds at the discrimination of step S95, image decoding processing is exited.

It should be noted that the YUV system is converted to the RGB system, though this is not illustrated. In upsampling of U, V at this time, identical values are substituted into two horizontal pixels without utilizing an interpolation filter.

FIG. 14 is a conceptual view of direct AC component prediction processing according to this embodiment. In this embodiment, approximation images (AC images) of an original pixel block are generated at a stroke from the neighboring DC image by the direct method of AC component prediction.

In accordance with the indirect method AC component prediction according to the prior art described above, the DC values of sub-blocks $S_1$~$S_4$ in a block S of interest are estimated in accordance with the following equations from the DC values (S, U, R, B, L) of four surrounding blocks and the block of interest:

$$S_1=S+(U+L-B-R)/8$$

$$S_2=S+(U+R-B-L)/8$$

$$S_3=S+(B+L-U-R)/8$$

$$S_4=S+(B+R-U-L)/8$$

FIG. 14(A) illustrates again a diagram similar to that of FIG. 17(B) described above. In similar fashion, $U_1$~$U_4$, $L_1$~$L_4$, $R_1$~$R_4$, $B_1$~$B_4$ are estimated in the first stage. By using the above-described method recursively, the four pixels $P_1$~$P_4$ in $S_1$ are estimated in accordance with the following equations:

$$P_1=S_1+(U_3+L_2-S_3-S_2)/8$$

$$P_2=S_1+(U_3+S_2-S_3-L_2)/8$$

$$P_3=S_1+(S_3+L_2-U_3-S_2)/8$$

$$P_4=S_1+(S_3+S_2-U_3-L_2)/8$$

the four pixels $P_1$~$P_4$ in $S_2$ are estimated in accordance with the following equations:

$$P_1=S_2+(U_4+S_1-S_4-R_1)/8$$

$$P_2=S_2+(U_4+R_1-S_4-S_1)/8$$

$$P_3=S_2+(S_4+S_1-U_4-R_1)/8$$

$$P_4=S_2+(S_4+R_1-U_4-S_1)/8$$

the four pixels $P_1 \sim P_4$ in $S_3$ are estimated in accordance with the following equations:

$$P_1 = S_3 + (S_1 + L_4 - B_1 - S_4)/8$$

$$P_2 = S_3 + (S_1 + S_4 - B_1 - L_4)/8$$

$$P_3 = S_3 + (B_1 + L_4 - S_1 - S_4)/8$$

$$P_4 = S_3 + (B_1 + S_4 - S_1 - L_4)/8$$

and the four pixels $P_1 \sim P_4$ in $S_4$ are estimated in accordance with the following equations:

$$P_1 = S_4 + (S_2 + S_3 - B_2 - R_3)/8$$

$$P_2 = S_4 + (S_2 + R_3 - B_2 - S_3)/8$$

$$P_3 = S_4 + (B_2 + S_3 - S_2 - R_3)/8$$

$$P_4 = S_4 + (B_2 + R_3 - S_2 - S_3)/8$$

FIG. 14B illustrates the direction method of AC component prediction according to this embodiment. Reference will be had to FIG. 14(A) as well in the description that follows. First, in a case where four pixels $P_1 \sim P_4$ in $S_1$ are found, the approximations $S_2 \approx S_3 \approx S$, $U_3 \approx U$, $L_2 \approx L$ are performed. When these approximations are applied to the equation of $P_1$ in $S_1$ above, the following is obtained:

$$P_1 = S_1 + (U_3 + L_2 - S_3 - S_2)/8$$
$$= S_1 + (U + L - S - S)/8$$

Furthermore, when the above equation of $S_1$, namely $S_1 = S + (U + L - B - R)/8$, is substituted into this equation, $P_1$ in $S_1$ can finally be expressed as follows:

$$P_1 = S + (2U + 2L - 2S - B - R)/8$$

Further, with regard to $P_2$ in $S_1$, the following is obtained:

$$P_2 = S_1 + (U_3 + S_2 - S_3 - L_2)/8$$
$$= S_1 + (U + S - S - L)/8$$

Furthermore, when the above equation of $S_1$, namely $S_1 = S + (U + L - B - R)/8$, is substituted into this equation, $P_2$ in $S_1$ can finally be expressed as follows:

$$P_2 = S + (2U - B - R)/8$$

Further, with regard to $P_3$ in $S_1$, the following is obtained:

$$P_3 = S_1 + (S_3 + L_2 - U_3 - S_2)/8$$
$$= S_1 + (S + L - U - S)/8$$

Furthermore, when the above equation of $S_1$, namely $S_1 = S + (U + L - B - R)/8$, is substituted into this equation, $P_3$ in $S_1$ can finally be expressed as follows:

$$P_3 = S + (2L - B - R)/8$$

Further, with regard to $P_4$ in $S_1$, the following is obtained:

$$P_4 = S_1 + (S_3 + S_2 - U_3 - L_2)/8$$
$$= S_1 + (S + S - U - L)/8$$

Furthermore, when the above equation of $S_1$, namely $S_1 = S + (U + L - B - R)/8$, is substituted into this equation, $P_4$ in $S_1$ can finally be expressed as follows:

$$P_4 = S + (2S - B - R)/8$$

Accordingly, $P_1 \sim P_4$ in $S_1$ can finally be expressed as follows:

$$P_1 = S + (2U + 2L - 2S - B - R)/8$$

$$P_2 = S + (2U - B - R)/8$$

$$P_3 = S + (2L - B - R)/8$$

$$P_4 = S + (2S - B - R)/8$$

Next, in a case where four pixels $P_1 \sim P_4$ in $S_2$ are found, the approximations $S_1 \approx S_4 \approx S$, $R_1 \approx R$, $U_4 \approx U$ are performed. When these approximations are applied to the equation of $P_1$ in $S_2$ above, the following is obtained:

$$P_1 = S_2 + (U_4 + S_1 - S_4 - R_1)/8$$
$$= S_1 + (U + S - S - R)/8$$

Furthermore, when the above equation of $S_2$, namely $S_2 = S + (U + R - B - L)/8$, is substituted into this equation, $P_1$ in $S_2$ can finally be expressed as follows:

$$P_1 = S + (2U - B - L)/8$$

Further, with regard to $P_2$ in $S_2$, the following is obtained:

$$P_2 = S_2 + (U_4 + R_1 - S_4 - S_1)/8$$
$$= S_2 + (U + R - S - S)/8$$

Furthermore, when the above equation of $S_2$, namely $S_2 = S + (U + R - B - L)/8$, is substituted into this equation, $P_2$ in $S_2$ can finally be expressed as follows:

$$P_2 = S + (2U + 2R - 2S - B - L)/8$$

Further, with regard to $P_3$ in $S_2$, the following is obtained:

$$P_3 = S_2 + (S_4 + S_1 - U_4 - S_1)/8$$
$$= S_2 + (S + S - U - R)/8$$

Furthermore, when the above equation of $S_2$, namely $S_2 = S + (U + R - B - L)/8$, is substituted into this equation, $P_3$ in $S_2$ can finally be expressed as follows:

$$P_3 = S + (2S - B - L)/8$$

Further, with regard to $P_4$ in $S_2$, the following is obtained:

$$P_4 = S_2 + (S_4 + R_1 - U_4 - S_1)/8$$
$$= S_2 + (S + R - U - S)/8$$

Furthermore, when the above equation of $S_2$, namely $S_2 = S + (U + R - B - L)/8$, is substituted into this equation, $P_4$ in $S_2$ can finally be expressed as follows:

$$P_4 = S + (2R - B - L)/8$$

Accordingly, $P_1 \sim P_4$ in $S_2$ can finally be expressed as follows:

$$P_1 = S + (2U - B - L)/8$$

$$P_2 = S + (2U + 2R - 2S - B - L)/8$$

$P_3=S+(2S-B-L)/8$ $P_4=S+(2R-B-L)/8$

Next, in a case where four pixels $P_1$~$P_4$ in $S_3$ are found, the approximations $S_1 \approx S_4 \approx S$, $L_4 \approx L$, $B_1 \approx B$ are performed. When these approximations are applied to the equation of $P_1$ in $S_3$ above, the following is obtained:

$$P_1 = S_3 + (S_1 + L_4 - B_1 - S_4)/8$$
$$= S_3 + (S + L - B - S)/8$$

Furthermore, when the above equation of $S_3$, namely $S_3=S+(B+L-U-R)/8$, is substituted into this equation, $P_1$ in $S_3$ can finally be expressed as follows:

$P_1=S+(2L-U-R)/8$

Further, with regard to $P_2$ in $S_3$, the following is obtained:

$$P_2 = S_3 + (S_1 + S_4 - B_1 - L_4)/8$$
$$= S_3 + (S + S - B - L)/8$$

Furthermore, when the above equation of $S_3$, namely $S_3=S+(B+L-U-R)/8$, is substituted into this equation, $P_2$ in $S_3$ can finally be expressed as follows:

$P_2=S+(2S-U-R)/8$

Further, with regard to $P_3$ in $S_3$, the following is obtained:

$$P_3 = S_3 + (B_1 + L_4 - S_1 - S_4)/8$$
$$= S_3 + (B + L - S - S)/8$$

Furthermore, when the above equation of $S_3$, namely $S_3=S+(B+L-U-R)/8$, is substituted into this equation, $P_3$ in $S_3$ can finally be expressed as follows:

$P_3=S+(2B+2L-2S-U-R)/8$

Further, with regard to $P_4$ in $S_3$, the following is obtained:

$$P_4 = S_3 + (B_1 + S_4 - S_1 - L_4)/8$$
$$= S_3 + (B + S - S - L)/8$$

Furthermore, when the above equation of $S_3$, namely $S_3=S+(B+L-U-R)/8$, is substituted into this equation, $P_4$ in $S_3$ can finally be expressed as follows:

$P_4=S+(2B-U-R)/8$

Accordingly, $P_1$~$P_4$ in $S_3$ can finally be expressed as follows:

$P_1=S+(2L-U-R)/8$ $P_2=S+(2S-U-R)/8$ $P_3=S+(2B+2L-2S-U-R)/8$ $P_4=S+(2B-U-R)/8$

Next, in a case where four pixels $P_1$~$P_4$ in $S_4$ are found, the approximations $S_2 \approx S_3 \approx S$, $R_3 \approx R$, $B_2 \approx B$ are performed. When these approximations are applied to the equation of $P_1$ in $S_4$ above, the following is obtained:

$$P_1 = S_4 + (S_2 + S_3 - B_2 - R_3)/8$$
$$= S_4 + (S + S - B - R)/8$$

Furthermore, when the above equation of $S_4$, namely $S_4=S+(B+R-U-L)/8$, is substituted into this equation, $P_1$ in $S_4$ can finally be expressed as follows:

$P_1=S+(2S-U-L)/8$

Further, with regard to $P_2$ in $S_4$, the following is obtained:

$$P_2 = S_4 + (S_2 + R_3 - B_2 - S_3)/8$$
$$= S_4 + (S + R - B - S)/8$$

Furthermore, when the above equation of $S_4$, namely $S_4=S+(B+R-U-L)/8$, is substituted into this equation, $P_2$ in $S_4$ can finally be expressed as follows:

$P_2=S+(2R-U-L)/8$

Further, with regard to $P_3$ in $S_4$, the following is obtained:

$$P_3 = S_4 + (B_2 + S_3 - S_2 - R_3)/8$$
$$= S_4 + (B + S - S - R)/8$$

Furthermore, when the above equation of $S_4$, namely $S_4=S+(B+R-U-L)/8$, is substituted into this equation, $P_3$ in $S_4$ can finally be expressed as follows:

$P_3=S+(2B-U-L)/8$

Further, with regard to $P_4$ in $S_4$, the following is obtained:

$$P_4 = S_4 + (B_2 + R_3 - S_2 - S_3)/8$$
$$= S_4 + (B + R - S - S)/8$$

Furthermore, when the above equation of $S_4$, namely $S_4=S+(B+R-U-L)/8$, is substituted into this equation, $P_4$ in $S_4$ can finally be expressed as follows:

$P_4=S+(2B+2R-2S-U-L)/8$

Accordingly, $P_1$~$P_4$ in $S_4$ can finally be expressed as follows:

$P_1=S+(2S-U-L)/8$ $P_2=S+(2R-U-L)/8$ $P_3=S+(2B-U-L)/8$ $P_4=S+(2B+2R-2S-U-L)/8$

Thus, in accordance with this embodiment, an approximation image of 4×4 pixels is obtained directly (in stepless fashion) from neighboring DC values (S, U, R, B, L) inclusive of its own DC value.

FIG. 15 is a graph of coding efficiency according to this embodiment. Using a sample image (320×240 pixels, with a precision of eight bits per pixel in each of the R, G, B components), coding performance was evaluated in accordance with $PSNR[dB]=20\log_{10}(255/\sqrt{(\epsilon^2)})$ versus $$BPR=[\text{total amount of data (bits) after compression}]/[\text{number of pixels in original image}]$$

where BPR represents bits per pixel and PSNR represents peak-to-peak signal-to-noise ratio. It should be noted that $\epsilon^2$ represents mean square error per pixel.

FIG. 15(A) illustrates the result in the case of an animated image, in which the solid line indicates the result in the case of this embodiment and the dotted line the result in the case of JPEG. A coding efficiency greatly exceeding that of JPEG was obtained, as illustrated. FIG. 15(B) illustrates the result in a case where a CG image is used. A tendency similar to that mentioned above was obtained. With the present scheme, moreover, mosquito noise and block noise peculiar to the orthogonal transformation coding method do not appear, and it is believed that this scheme is effective for artificial images. Though not shown, a performance substantially the same as that of JPEG was obtained for natural images.

Though an example of application to a game machine is described above in the foregoing embodiment, it is obvious that the present invention can be applied also to the coding/decoding of ordinary frame images such as photographic images and animated images.

Though a preferred embodiment of the present invention is described above, it goes without saying that the components, processing and combinations thereof may be modified in various ways without departing from the idea of the present invention.

Thus, in accordance with the present invention, as described above, since the nest can be lightened and the amount of variable-length code reduced, the computation load at the time of decoding can be reduced and it is possible to utilize moving-picture and still-picture image data, without degrading image quality, even in a system having a comparatively low performance. In addition, mosquito noise is not produced even at contours and it is possible to provide highly compressed image data featuring good reproducibility in regard to characters and animated images.

What is claimed is:

1. An image coding method comprising: dividing image data into a plurality of pixel blocks and generating a DC image comprising mean values of respective ones of the blocks; separating from each pixel block a corresponding block mean value and obtaining a residual vector for every block; and in a case where the magnitude of the residual vector is equal to or greater than an allowable value, obtaining one or two or more orthogonal bases for approximating the residual vector by an adaptive orthogonal transformation that employs a nest of the DC image; and coding an orthogonal base system comprising a linear combination of these orthogonal bases.

2. An image coding method according to claim 1, wherein in a case where the magnitude of the residual vector is less than the allowable value in claim (1) of the present invention, information indicative of number of bases=0 is coded instead of obtaining orthogonal bases.

3. An image coding method according to claim 1, wherein in a case where total amount of code of an obtained orthogonal base system becomes equal to or greater than total amount of code of the residual vector, the residual vector itself is coded instead of the orthogonal base system.

4. An image coding method according to claim 1, wherein in a case where a first error $<d_{nk}>$ with respect to a residual vector $<d>$ becomes less than the allowable value owing to a number nk of bases obtained in advance, second error vectors $<d_m>$ following use of m ($0 \leq m < nk$) bases in the order in which the bases were obtained are scalar-quantized by quantization coefficients $Q_{yk}$ predetermined in accordance with a number yk (=nk−m) of remaining bases that have not been used, and the result is subjected to scalar inverse quantization; the smallest error is selected from among third error vectors $<d'_m>$ of nk types, which are obtained by subtracting the scalar inverse-quantized second error vectors from said second error vectors $<d_m>$, and said first error $<d_{nk}>$; and the corresponding bases and, if necessary, the corresponding second error vector, are coded.

5. An image coding/decoding method wherein on the basis of a total of five items of DC image data of upper, bottom, left, right blocks U, B, L, R inclusive of a local block S comprising a block mean value of K×K pixels, items of pixel data $P_1 \sim P_4$ of (K/2)×(K/2) pixels of a first sub-block $S_1$ at the upper left of the local block S are obtained in accordance with the following equations:

$$P_1=S+(2U+2L-2S-B-R)/8$$

$$P_2=S+(2U-B-R)/8$$

$$P_3=S+(2L-B-R)/8$$

$$P_4=S+(2S-B-R)/8$$

items of pixel data $P_1 \sim P_4$ of pixels (K/2)×(K/2) of a second sub-block $S_2$ at the upper right of the local block S are obtained in accordance with the following equations:

$$P_1=S+(2U-B-L)/8$$

$$P_2=S+(2U+2R-2S-B-L)/8$$

$$P_3=S+(2S-B-L)/8$$

$$P_4=S+(2R-B-L)/8$$

items of pixel data $P_1 \sim P_4$ of pixels (K/2)×(K/2) of a third sub-block $S_3$ at the lower left of the local block S are obtained in accordance with the following equations:

$$P_1=S+(2L-U-R)/8$$

$$P_2=S+(2S-U-R)/8$$

$$P_3=S+(2B+2L-2S-U-R)/8$$

$$P_4=S+(2B-U-R)/8$$

and/or items of pixel data $P_1 \sim P_4$ of pixels (K/2)×(K/2) of a fourth sub-block $S_4$ at the lower right of the local block S are obtained in accordance with the following equations:

$$P_1=S+(2S-U-L)/8$$

$$P_2=S+(2R-U-L)/8$$

$$P_3=S+(2B-U-L)/8$$

$$P_4=S+(2B+2R-2S-U-L)/8.$$

6. A computer-readable recording medium on which has been recorded a program for causing a computer to execute the processing described in any one of claims (1) to (5).

* * * * *